(12) United States Patent
Litomisky

(10) Patent No.: US 10,634,377 B2
(45) Date of Patent: Apr. 28, 2020

(54) INDUSTRIAL ON-DEMAND EXHAUST VENTILATION SYSTEM WITH CLOSED-LOOP REGULATION OF DUCT AIR VELOCITIES

(71) Applicant: Ecogate, Inc., North Hollywood, CA (US)

(72) Inventor: Ales Litomisky, La Crescenta, CA (US)

(73) Assignee: Ecogate, Inc., North Hollywood, CA (US)

(*) Notice: Subject to any disclaimer, the term of this patent is extended or adjusted under 35 U.S.C. 154(b) by 392 days.

(21) Appl. No.: 15/487,095

(22) Filed: Apr. 13, 2017

(65) Prior Publication Data

US 2017/0248335 A1    Aug. 31, 2017

Related U.S. Application Data

(63) Continuation-in-part of application No. 13/947,616, filed on Jul. 22, 2013, now Pat. No. 9,657,958.

(51) Int. Cl.
*F24F 11/30* (2018.01)
*F24F 7/007* (2006.01)
(Continued)

(52) U.S. Cl.
CPC .............. *F24F 11/30* (2018.01); *F24F 7/007* (2013.01); *F24F 11/0001* (2013.01);
(Continued)

(58) Field of Classification Search
CPC ......... F24F 11/30; F24F 11/0001; F24F 7/007
(Continued)

(56) References Cited

U.S. PATENT DOCUMENTS 5,586,861 A   12/1996 Berger
6,012,199 A   1/2000 Litomisky
(Continued)

FOREIGN PATENT DOCUMENTS

AU   2008348110 A1   7/2009
AU   2008348110 B2   7/2013
(Continued)

OTHER PUBLICATIONS

PCT, Notification of Transmittal of the International Search Report and the Written Opinion of the International Searching Authority, or the Declaration, Application No. PCT/US2014/047382, dated Nov. 20, 2014.
(Continued)

*Primary Examiner* — Edelmire Bosques
*Assistant Examiner* — Dana K Tighe
(74) *Attorney, Agent, or Firm* — Kevin Schraven; Anooj Patel; Hankin Patent Law, APC

(57) ABSTRACT

An air pressure measuring ventilation system, comprising: at least one duct; at least one motorized exhaust fan; and one or more air pressure sensors. The at least one motorized exhaust fan may draw air through the at least one duct. The one or more air pressure sensors may be placed on a side of the at least one duct such that an air pressure is measured as the air is drawn through the at least one duct, such that a plurality of air pressure measurements are generated. The one or more air pressure sensors may be substantially flush with an interior side of the at least one duct and do not obstruct the air as the air is drawn through the at least one duct.

9 Claims, 14 Drawing Sheets

(51) Int. Cl.
*F24F 11/00* (2018.01)
*F24F 110/00* (2018.01)
*F24F 120/14* (2018.01)
*F24F 110/30* (2018.01)
*F24F 110/40* (2018.01)
*F24F 11/63* (2018.01)
*F24F 11/77* (2018.01)

(52) U.S. Cl.
CPC .............. *F24F 11/63* (2018.01); *F24F 11/77* (2018.01); *F24F 2110/00* (2018.01); *F24F 2110/30* (2018.01); *F24F 2110/40* (2018.01); *F24F 2120/14* (2018.01)

(58) Field of Classification Search
USPC .......................................................... 454/236
See application file for complete search history.

(56) References Cited

U.S. PATENT DOCUMENTS

| | | | |
|---|---|---|---|
| 6,125,710 A * | 10/2000 | Sharp | G01N 1/26 73/863.01 |
| 7,146,677 B2 | 12/2006 | Litomisky | |
| 7,854,175 B2 | 12/2010 | Weilguny | |
| 8,570,050 B2 | 10/2013 | Nyfors | |
| 2008/0139105 A1 | 12/2008 | Kuentz | |
| 2009/0044634 A1 | 2/2009 | Weilguny | |
| 2010/0145636 A1 | 6/2010 | Nyfors | |
| 2010/0292544 A1 | 11/2010 | Sherman et al. | |
| 2011/0053488 A1 | 3/2011 | Gans | |

FOREIGN PATENT DOCUMENTS

| | | |
|---|---|---|
| CA | 2123640 A1 | 11/1994 |
| CA | 2712478 A1 | 7/2009 |
| EP | 0626519 A1 | 11/1994 |
| EP | 2104837 A1 | 9/2009 |
| EP | 2247899 A1 | 11/2010 |
| JP | 07151093 A | 6/1995 |
| SG | 187488 A1 | 2/2013 |
| WO | 2008069874 A2 | 6/2008 |
| WO | 2008085065 A1 | 7/2008 |
| WO | 2008069874 A2 | 9/2008 |
| WO | 2009091477 A1 | 7/2009 |

OTHER PUBLICATIONS

Ales Litomisky, Exhaust Ventilation Energy Saving in Car Manufacturing and Other Industries. WEEC Washington 2006.

Ales Litomisky, Ales Litomisky: Industrial Ventilation Statistics, IETC 2006.

Ales Litomisky and Krystof Litomisky, Use of Statistical Approach to Design an Optimal Duct System for On-demand Industrial Exhaust Ventilation, IETC 2010.

* cited by examiner $D_8 (U_8; 0)$ $D_7 (U_7; 0)$ $D_6 (U_6; 0)$ $D_5 (U_5; 0)$ $D_4 (U_4; 0)$ $D_3 (U_3; 7; 8)$   $U_3 = U_7 + U_8$ $D_2 (U_2; 4; 5; 6)$   $U_2 = U_4 + U_5 + U_6$ $D_1 (U_1; 2; 3)$   $U_1 = U_2 + U_3$

INDUSTRIAL ON-DEMAND EXHAUST VENTILATION SYSTEM WITH CLOSED-LOOP REGULATION OF DUCT AIR VELOCITIES

CROSS-REFERENCE TO RELATED APPLICATIONS

This patent application is a Continuation-in-Part of U.S. Non-Provisional patent application Ser. No. 13/947,616, filed on Jul. 22, 2013, titled "Industrial On-Demand Exhaust Ventilation System With Closed-Loop Regulation of Duct Air Velocities", by inventor Ales Litomisky, the contents of which are expressly incorporated herein by this reference as though set forth in their entirety and to which priority is claimed.

FIELD OF THE DISCLOSURE

This disclosure relates generally to systems, methods, and devices for measuring and maintaining air velocity in ducts and ventilation systems. In particular, this disclosure relates to automatically measuring and maintaining air velocity in ducts in an energy efficient manner with material being transported for industrial exhaust ventilation.

BACKGROUND

The ability to measure air velocity in a duct system has been increasing in importance. Materials being transported in an industrial exhaust ventilation system, for instance, are combustible and may be highly flammable and explosible under certain conditions. One such material is combustible dust, which is finely divided solid material such as plastic, wood, or metal that presents a fire or explosion hazard when dispersed and ignited in air or any other gaseous oxidizers. These combustible dusts are frequently created as an unwanted by-product and are generally removed from production workspaces as transported material by a central ventilation system. Due to the combustible nature of these transported materials, it is often desirable and important to prevent the transported materials from settling in these ducts. This generally helps prevent or lower the risk of combustion occurring in the ventilation system. In order to achieve this, it is usually necessary to maintain minimum transport velocities for the given materials at all times and in all ducts of the ventilation system.

The recommended minimum transport velocity for different materials is available in A Manual of Recommended Practice, published by American Conference of Governmental Industrial Hygienists (ACGIH®). The National Fire Protection Association (NFPA) has also issued a number of publications relating to the prevention of industrial dust explosions. These standards and best practices are generally adopted into regulations set forth by OSHA, CAL/OSHA, and other state and federal regulatory bodies.

Currently, there is no economically viable air velocity meter on the market that will measure materials transported through a ventilation system such as combustible dust. All currently available cost-effective velocity meters only work in clean air and obstruct the transported material, thereby blocking the duct system and collecting such material. To ensure that the air velocity is above the recommended and relevant standards, many have measured and recorded the air velocities throughout the entire ventilation system during installation. However, manufacturers must regularly change their installation and manufacturing setup as a result of market changing conditions, including the release of new products, the increase of newer more efficient production machines, and space constraints and changes.

Additionally, re-measuring the air velocity in duct systems that are changed, redesigned, or upgraded is not always completed. As a result of these constant changes, the air velocities in some ventilation system ducts may become inadequate and may lead to settlement of material. The air velocities in other parts of the ventilation system may also become too high, causing a significant waste of energy. For example, in Industrial Ventilation Statistics, IETC 2006, written by Ales Litomisky, the measured velocities in the main ducts of 73% of ventilation systems have been shown to be outside the recommended range.

Due to fast-changing market conditions, manufacturers frequently change their manufacturing setup by utilizing an on-demand ventilation system. An on-demand ventilation system generally offers a better alternative than classic ventilation systems due to the use of sensors, gates, variable frequency drives, and control systems to adjust its system's performance.

On-demand ventilation systems also save a significant amount of electricity on fan operation compared to classic systems up to 30% to 70%. By removing less air from buildings, additional significant savings in systems that use such air-conditioned systems increase. U.S. Pat. No. 7,146,677, issued on Dec. 12, 2006, to co-inventor Ales Litomisky, the same inventor of the present disclosure, the contents of which are expressly incorporated herein by this reference as though set forth in its entirety, discloses an energy efficient and on-demand ventilation system. U.S. Pat. No. 6,012,199, issued on Jan. 11, 2000, to co-inventor Ales Litomisky, is also hereby incorporated by this reference, as though set forth herein in its entirety.

In order to adjust and regulate the ventilation system properly, knowledge of air velocities along the length of the entire ventilation system while the system is being used is important. This task may be difficult because no reasonably priced air velocity meters are available on the market to analyze material being transported in the air. Rather, manufacturers shut down its production and then measure the air flow velocity, volume, and static air pressure in the ducts of the ventilation system. This generally takes several hours of work, at which, during this time, the facility or factory stalls its production. Rather, the most commonly used air velocity meters are configured to work on a Pitot tube probe and are evaluated by a precise differential pressure meter. The Pitot tube generally consists of an impact tube which measures velocity pressure input installed inside a second tube of a larger diameter, which measures static air pressure input from radial sensing holes around the tip. This type of meter is an obstacle for the transported material and cannot be used during the normal use of a dust exhaust ventilation system.

Other types of air velocity meters work based on "thermal convective mass flow measurement." These meters or probes, however, also present obstacles in the duct, leading to blockage of the material in the duct system and damage to the probes.

The third possible alternative to measure air velocity is to use meters with an ultrasonic transmitter and receiver. Ultrasonic meters, for instance, are typically used on boats or at airports to measure wind speed. An ultrasonic meter, however, is effectively useless in a duct used to ventilate dust due to the distortion of the ultrasonic signal by the dust or other transported material. Although it would be possible to measure air velocity in a duct based on the laser Doppler principle or triboelectric effect, such systems would be prohibitively expensive and would simply not be a viable option.

Accordingly, real-time measurements of air velocity inside the duct system that is cost-effective are currently unavailable. Rather, such real-time measurements pose a risk of obstruction with dust or other materials that are being transported with the air flow in the ventilation system.

Thus, what is needed is a cost effective and energy efficient system, method, and device that automatically provides numerous sampling of air velocity measurements. Preferably, this system, method, and device will measure dust and other materials being transported inside the duct system during factory production. Furthermore, because most ventilation systems service multiple work stations that may go online and/or offline at any moment, a system, method, and device that self regulates and provides automatic adjustments to the system to maintain an optimal air flow is also needed.

SUMMARY

To minimize the limitations in the cited references, and to minimize other limitations that will become apparent upon reading and understanding the present specification, the present disclosure may be an energy efficient and cost effective system, method, and device for measuring air flow velocity of material being transported within a duct system based on a static air pressure measurement with single point calibration or alternatively without necessary calibration.

The ventilation system is part of a factory or facility and is preferably connected to one or more workstations through one or more drop ducts. Each drop duct preferably has a gate that, depending on the needs of the user, opens and closes to ventilate each workstation. The drop ducts feed air into branch ducts and then into main ducts, which terminate at a dust collection unit. The ventilation system is preferably powered by a fan, which is connected to a motor, wherein the motor is preferably driven by a variable frequency drive. The ventilation system may also include a central control computer or control system (any device with an electronic data processing unit) that controls the opening and closing of gates and fan speed in order to ensure that the air flow in all of the ducts is fast enough to prevent dust, particles, and any other materials from settling anywhere within the ducts. This configuration will also prevent the air from flowing too fast as to waste energy without improving ventilation. The air flow or air volume is preferably kept at optimal levels by: (1) unobtrusively monitoring the static air pressure of all relevant locations in the ventilation system, (2) calculating the air flow or air volume at the measured locations, and (3) adjusting the gates and fan speed.

The static air pressure is preferably measured at or near the drop gates so that the user and control computer may precisely determine the impact of a partial closure of that gate. Additionally, the control computer is preferably programed to control all the gates based on workstation activity and the requirements of proper air flow. The desired air flow is preferably provided by standards, which are adopted into various governmental regulations and legislation.

There is preferably only one minimum transport velocity, which is determined by type of material transported—very light dust will have for example 3,500 FPM minimum transport velocity, while heavy dust might have 4,500 FPM minimum transport velocity.

One embodiment may be a closed-loop regulation method of a ventilation system using a control computer, the steps comprising: providing a ventilation system; wherein the ventilation system is comprised of: at least one duct, at least one motorized exhaust fan, one or more gates; one or more workstations; a control computer, and one or more sensors; wherein each of the one or more workstations has at least one of the one or more gates; wherein the control computer is configured to open and close the one or more gates; wherein the control computer is configured to adjust a speed of the motorized exhaust fan; using the one or more sensors to determine one or more actual air velocities within the ventilation system; providing one or more minimum air velocities that must be maintained throughout the ventilation system; monitoring by the control computer the one or more air velocities; maintaining by the control computer that the one or more actual air velocities are above the relevant minimum air velocity. The maintaining step may be accomplished by the step of: adjusting by the control computer the speed of the motorized exhaust fan, or by opening and closing the one or more gates by the control computer, or by doing both. Preferably one or more gates are initially closed at the one or more workstations that are non-active and are initially open at the one or more workstations that are active. Preferably, the control computer is configured to partially open and partially close the one or more gates in order to accomplish the maintaining step. Preferably, the method further includes the steps of balancing by the control computer the one or more actual air velocities within the at least one duct; calibrating and mapping the ventilation system; wherein the user is warned by the ventilation system fails the calibrating step; and running the ventilation system in one or more safety modes if the one or more sensors fail.

Another embodiment may be an air pressure measuring ventilation system, comprising: at least one duct; at least one motorized exhaust fan; and one or more air pressure sensors; wherein the at least one motorized exhaust fan is configured to draw air through the at least one duct; wherein the one or more air pressure sensors are placed on a side of the at least one duct such that an air pressure is measured as the air is drawn through the at least one duct, such that a plurality of air pressure measurements are generated; wherein the one or more air pressure sensors are configured to be flush with an interior side of the at least one duct and do not obstruct the air as the air is drawn through the at least one duct. Preferably the air pressure measuring ventilation system further comprises a dust collector and one or more workstations and the ventilation system is configured to ventilate dust, particulate matter, or fumes, which are generated at the one or more workstations. Because the one or more air pressure sensors are flush, they do not obstruct the dust as it travels along the at least one duct from the one or more workstations to the dust collector. The system may further comprise a control computer, also referred to as central control computer, central computer, central processing unit. The plurality of air pressure measurements are preferably uploaded (via transfer, transmission, or any industrial communication protocol, wired or wireless) to the control computer. The control computer may use the plurality of air pressure measurements to calculate a plurality of calculated air velocities. The air pressure measuring ventilation system may further comprise one or more gates; wherein the one or more gates are preferably positioned along the at least one duct between the one or more workstations and the dust collector; and wherein the control computer is preferably configured to control an opening and a closing of the one or more gates and to control a speed of the motorized exhaust fan. The control computer is preferably configured with a plurality of minimum air velocities that must be maintained.

The minimum air velocities are dependent on the material being moved. The control computer may compare the plurality of calculated air velocities to a relevant minimum air velocity needed as related to the material being transported and determines if any of the plurality of calculated air velocities is less than the relevant minimum air velocity; and if any of the plurality of calculated air velocities is less than the relevant minimum air velocity, the control computer adjusts the one or more gates and adjusts the speed of the motorized exhaust fan such that one or more deficient air velocities are raised to above the relevant minimum air velocity that must be maintained.

The control computer preferably compares the plurality of calculated air velocities to a relevant minimum air velocity as related to the material being transported and determines if any of the plurality of calculated air velocities is less than the relevant minimum air velocity. If any of the plurality of calculated air velocities is less than the relevant minimum air velocity the control computer adjusts the one or more gates and/or adjusts the speed of the motorized exhaust fan, such that one or more deficient air velocities are raised to above one or more of the plurality of minimum air velocities that must be maintained. Additionally, the control computer is preferably configured to adjust the one or more gates and/or adjust the speed of the motorized exhaust fan if any of the plurality of calculated air velocities exceeds an optimal air velocity, such that the ventilation system is rendered more energy efficient. The control computer is preferably configured to automatically adjust the one or more gates and adjust the speed of the motorized exhaust fan if any of the plurality of calculated air velocities are not within an optimal range. Preferably the one or more gates is connected to at least one of the one or more air pressure sensors. The plurality of calculated air velocities are preferably calibrated by taking a plurality of air velocity measurements with a removable air velocity probe placed substantially near a plurality of locations of the one or more air pressure sensors. In one embodiment, the air pressure measuring ventilation system may have a sensor with a pair of hoses, ends, or openings that are placed on opposite sides of the one or more gates (so-called differential pressure sensor), such that calibration with a removable air velocity probe is unnecessary.

Another embodiment may be an air pressure measuring ventilation system, comprising: at least one duct; at least one motorized exhaust fan; one or more air pressure sensors; a dust collector; one or more workstations; a control computer; and one or more gates. The at least one motorized exhaust fan may be configured to draw air through the at least one duct. The one or more air pressure sensors may be placed on a side of the at least one duct such that an air pressure is measured as the air is drawn through the at least one duct, such that a plurality of air pressure measurements are generated. The one or more air pressure sensors may be configured to be substantially flush with an interior side of the at least one duct and do not obstruct the air as the air is drawn through the at least one duct. The ventilation system may be configured to ventilate a dust that is generated at the one or more workstations. Preferably, the one or more air pressure sensors do not obstruct the dust as it travels along the at least one duct from the one or more workstations to the dust collector. The plurality of air pressure measurements may be used to calculate a plurality of calculated air velocities. The plurality of calculated air velocities may be sent to the control computer. The one or more gates may be positioned along the at least one duct between the one or more workstations and the dust collector. The control computer may be configured to control an opening and a closing of the one or more gates and to control a speed of the motorized exhaust fan. The control computer may be configured with a plurality of minimum air velocities that must be maintained. The control computer may compare the plurality of calculated air velocities to a relevant minimum air velocity needed as related to the material being transported and determines if any of the plurality of calculated air velocities is less than the relevant minimum air velocity; and, if any of the plurality of calculated air velocities is less than the relevant minimum air velocity, the control computer adjusts the one or more gates and adjusts the speed of the motorized exhaust fan such that one or more deficient air velocities are raised to the relevant air velocity that must be maintained. The control computer may be configured to adjust the one or more gates and adjust the speed of the motorized exhaust fan if any of the plurality of calculated air velocities are not within an optimal range, such that the ventilation system may be rendered more energy efficient. A the plurality of calculated air velocities may be calibrated by taking a plurality of air velocity measurements with a removable air velocity probe placed substantially near a plurality of locations of the one or more air pressure sensors. Alternatively, a pair of hoses, ends, or openings from one of the one or more air pressure sensors may be placed on opposite sides of the one or more gates, such that calibration with a removable air velocity probe may be unnecessary.

Meaning of adjusting the gates is either partially or fully open, or fully closed. Partially open gate is used for adjusting the air velocity at particular drop, and plurality of the adjustments at plurality of drops to adjust airflow in whole branch and in whole system.

Another embodiment may be an air pressure measuring ventilation system, comprising: at least one duct; at least one motorized exhaust fan; one or more air pressure sensors; and one or more gates. The at least one motorized exhaust fan may be configured to draw air through the at least one duct. The one or more air pressure sensors may be placed on a side of the at least one duct such that an air pressure may be measured as the air is drawn through the at least one duct, such that a plurality of air pressure measurements are generated. The one or more air pressure sensors may be configured to be substantially flush with an interior side of the at least one duct and do not obstruct the air as the air is drawn through the at least one duct. The one or more gates may be positioned along the at least one duct, wherein a pair of hoses, ends, or openings from one of the one or more air pressure sensors may be placed substantially near, and on opposite sides of, the one or more gates, and the one or more air pressure sensors may be configured to measure a plurality of air pressure measurements, and the plurality of air pressure measurements may be used to calculate a plurality of calculated air velocities. The plurality of calculated air velocities may be calibrated without needing an external air velocity probe. The air pressure measuring ventilation system may further comprise a control computer, and the plurality of calculated air velocities may be sent to the control computer. The control computer may be configured to adjust the one or more gates and adjust a speed of the motorized exhaust fan if any of the plurality of calculated air velocities are not within an optimal range, such that the ventilation system may be rendered more energy efficient. The control computer may be configured with a plurality of minimum air velocities that must be maintained. The control computer may compare the plurality of calculated air velocities to a relevant minimum air velocity as related to the material being transported, and determines if any of the plurality of calculated air velocities is less than the relevant minimum air velocity; and if any of the plurality of calculated air velocities is less than the relevant minimum air velocity, the control computer adjusts the one or more gates and adjusts the speed of the motorized exhaust fan such that one or more deficient air velocities are raised to above of the relevant minimum air velocity that must be maintained.

Another embodiment may be a method of calculating air velocities within a ventilation system, the steps comprising: providing a ventilation system; wherein the ventilation system may be comprised of: at least one duct, at least one motorized exhaust fan, and one or more air pressure sensors; drawing air through the at least one duct when the at least one motorized exhaust fan is turned on; wherein the one or more air pressure sensors are placed on a side of the at least one duct; measuring an air pressure by the one or more air pressure sensors as air is drawn through the at least one duct, such that a plurality of air pressure measurements are generated; and calculating a plurality calculated air velocities from the plurality of air pressure measurements. The method may further comprise the steps of providing a control computer; wherein the calculating step is performed by the control computer. Alternatively, the steps may further comprise providing a control computer; and providing one or more electronic data processing units that are connected to the one or more air pressure sensors; wherein the calculating step is performed by the one or more electronic data processing units; transmitting to the control computer a plurality of calculated air velocities. Preferably, the one or more air pressure sensors are configured to be flush with an interior side of the at least one duct and do not obstruct the air as the air is drawn through the at least one duct. Preferably, the ventilation system further comprises a dust collector and one or more workstations and further comprises the steps of: generating a dust at the one or more workstations; ventilating by the ventilation system the dust that is generated at the one or more workstations; wherein the one or more air pressure sensors do not obstruct the dust as it travels along the at least one duct from the one or more workstations to the dust collector. The ventilation system may further comprise a control computer and one or more gates; wherein the one or more gates are positioned along the at least one duct between the one or more workstations and the dust collector; and wherein the control computer is configured to control an opening and a closing of the one or more gates and to control a speed of the motorized exhaust fan. Preferably, the control computer is configured with a plurality of minimum air velocities that must be maintained. The method may also include the steps of: comparing by the control computer the plurality of calculated air velocities to the relevant minimum air velocity; determining if any of the plurality of calculated air velocities is less than the relevant minimum air velocity; and adjusting by the control computer the one or more gates and the speed of the motorized exhaust fan if any of the plurality of calculated air velocities is less than any of the plurality of minimum air velocities, such that one or more deficient air velocities are raised to above one or more of the plurality of minimum air velocities that must be maintained. The control computer may compare the plurality of calculated air velocities to a relevant minimum air velocity as related to the material being transported, and determines if any of the plurality of calculated air velocities is less than the relevant minimum air velocity; and if any of the plurality of calculated air velocities is less than the relevant minimum air velocity, the control computer adjusts the one or more gates and adjusts the speed of the motorized exhaust fan such that one or more deficient air velocities are raised to above one or more of the plurality of minimum air velocities that must be maintained. The method may further comprise the steps of adjusting by the control computer the one or more gates and the speed of the motorized exhaust fan if any of the plurality of calculated air velocities exceeds an optimal air velocity, such that the ventilation system is rendered more energy efficient. Preferably each of the one or more gates is connected to at least one of the one or more air pressure sensors. The method may further comprise the steps of: calibrating the air velocity calculation by taking a plurality of air velocity measurements with a removable air velocity probe substantially near a plurality of locations of the one or more air pressure sensors. The calibrating step is preferably performed with the use of a tablet computer that is wirelessly connected to the sensors and probes. Alternatively the calibration is not necessary if the pressure is measured at both sides of the gate (differential pressure measurement).

It is an object of the system to provide a ventilation system, method, and device that prevents (or essentially prevents) dust or other transported materials to settle in the ducts of the ventilation system. The ventilation system is preferably also energy efficient and air flow velocity is usually kept from substantially exceeding a desired maximum.

It is another object of the system to provide a dust/particulate matter ventilation system that does not allow dust to settle within any ducts of the system.

It is another object of the system to measure the air flow of the ventilation system without obstructing the air flow of the system.

It is another object of the system that the ventilation system maintains a minimum air flow in all ducts of the system.

It is another object of the system to provide a method of measuring/calculating the air velocity at every outlet (drop) of the exhaust ventilation system with materials being transported in the duct system.

It is another object of the system to provide a method of calculating air velocities in every part of the duct system based on measurements located at the duct outlets, the known duct diameters, and the manner, in which the duct outlets are connected together.

It is another object of the system to provide a method of closed-loop regulation by using a central control system, based on known air velocities in every part of the duct system to ensure proper minimum transport velocities and outlet air velocities.

It is another object of the system to overcome the limitations of the prior art.

Other features and advantages are inherent in the on-demand exhaust ventilation system claimed and disclosed will become apparent to those skilled in the art from the following detailed description and its accompanying drawings.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE VARIOUS EMBODIMENTS

Figure 1:
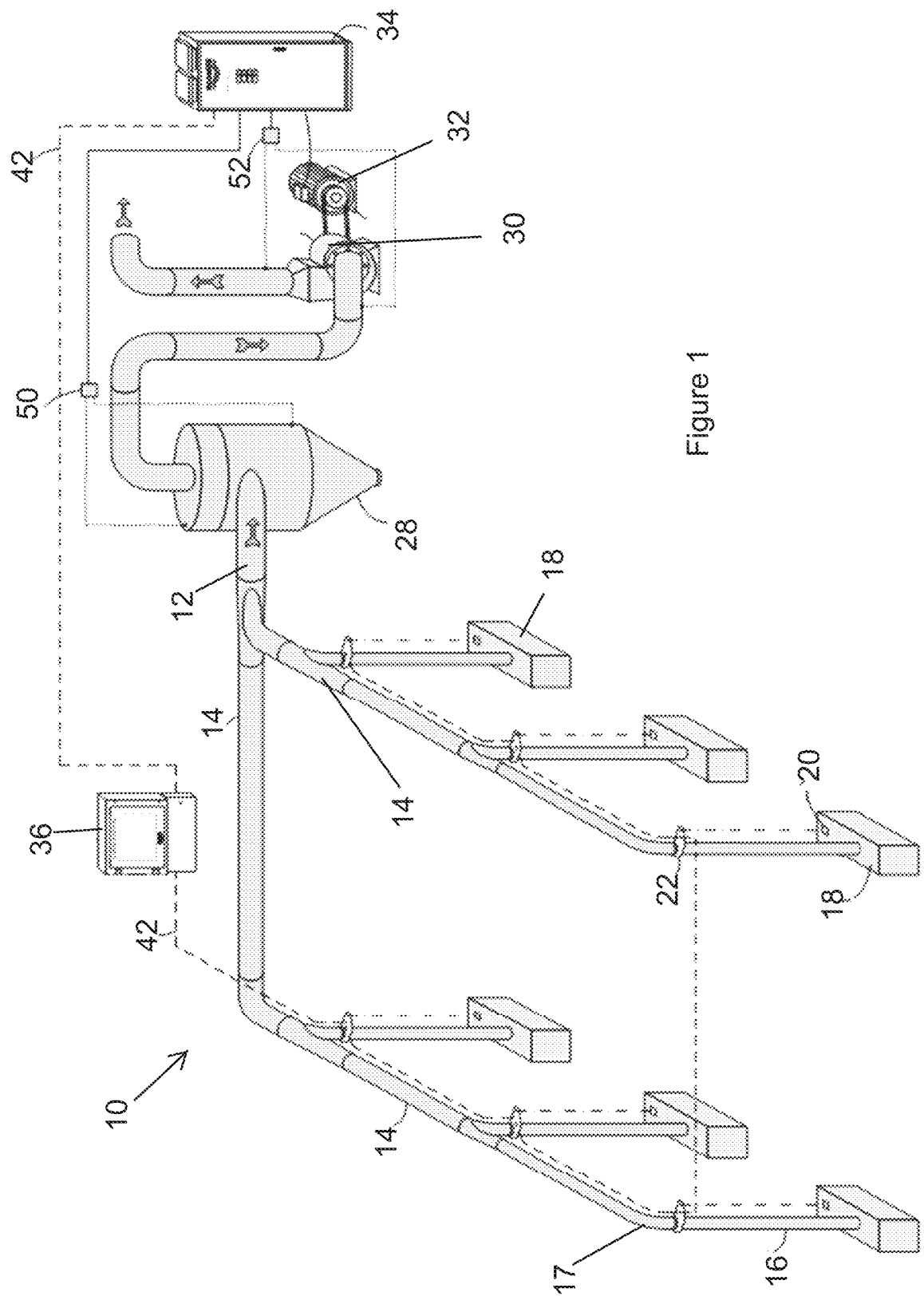
FIG. 1 is a representative illustration of one embodiment of the ventilation system.

In the following detailed description of various embodiments, numerous specific details are set forth in order to provide a thorough understanding of various aspects of one or more embodiments. However, these embodiments may be practiced without some or all of these specific details. In other instances, well-known methods, procedures, and/or components have not been described in detail so as not to unnecessarily obscure aspects of embodiments of the present disclosure.

While multiple embodiments are disclosed, other embodiments will become apparent to those skilled in the art from the following detailed description, which shows and describes illustrative embodiments. As will be realized, the system and method described herein is capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment of the disclosure shall not be interpreted to limit the scope of the disclosure.

In the following description, certain terminology is used to describe certain features of one or more embodiments of the system. For instance, the term "electronic data processing unit" generally refers to any device that processes information with an integrated circuit chip, including without limitation, mainframe computers, control computer, embedded computers, workstations, servers, desktop computers, portable computers, laptop computers, telephones, smartphones, embedded computers, wireless devices including cellular phones, tablet computers, personal digital assistants, digital media players, portable game players, cloud based computers, and hand-held computers. The term "control computer" is generally any specially-purposed computer or electronic data processing unit that is integrated into a ventilation system and controls the gates, fans, and other mechanical devices of that system such that the air velocity and air volumes within the system are controllable by the control computer.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 1-10% from the indicated number or range of numbers.

Overview of the Ventilation Device

Figure 2:
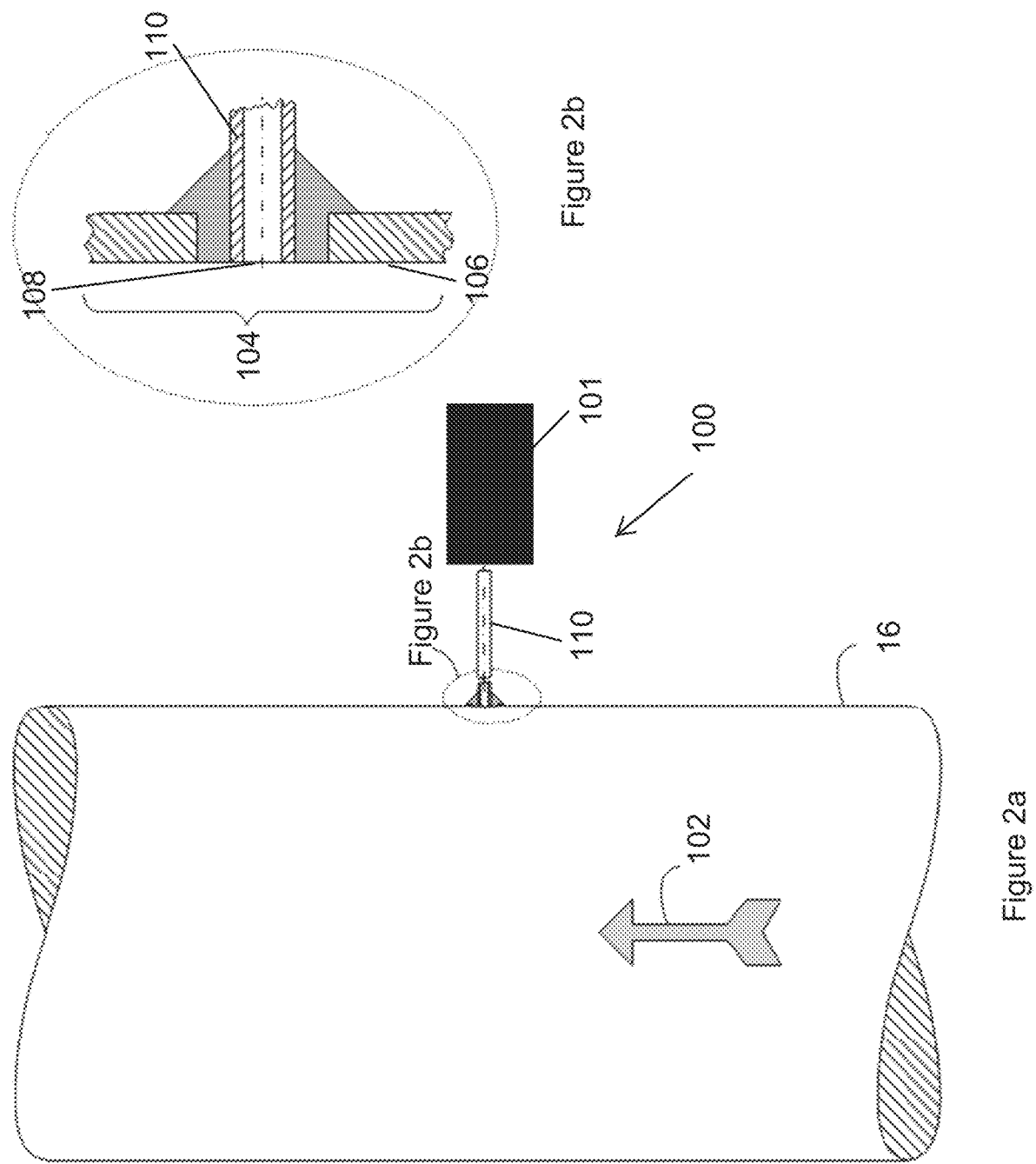
FIGS. 2a-2b are illustrations of one embodiment of an air pressure sensor of the ventilation system.

FIG. 1 is a representative illustration of one embodiment of the ventilation system. As shown in FIG. 1, the ventilation system 10 is preferably comprised of a main duct 12, branch ducts 14, drop ducts (also referred to as drops) 16, workstations 18, workstation activity sensor 20, gates 22, dust collector 28, fan 30, motor 32, variable frequency drive 34, control computer 36, electrical connection 42, filter pressure sensor 50, and fan pressure sensor 52. The gates 22 preferably include an air pressure sensor 100, which is shown in FIGS. 2a-2b. The fan 30, motor 32, and variable frequency drive 34 are preferably all components of a motorized exhaust fan, which is configured to draw air through the ducts 12, 14, 16, 17. The air pressure sensors 100 are placed on an interior side within the ducts 12, 14, 16, such that the air pressure is measured as air is drawn through the ducts 12, 14, 16 (shown in FIGS. 2a-2b).

FIG. 1 shows that the ventilation system 10 preferably ventilates dust, particulate matter, or fumes that are generated at the workstations 18. The dust is collected by the dust collector 28. Although FIG. 1 shows the gates 22 as being close to the start of the drop, it is preferred that the gate is at least three duct diameters away from any elbows 17 or hoods of workstations 18.

FIG. 1 shows that the ducts increase in diameter size as the ducting gets closer to the fan 30. For example, duct 12 has a smaller diameter than duct 14. This allows the system to keep the dust or other materials to keep moving and a minimum velocity to be maintained.

Different Materials

FIGS. 2a-2b are illustrations of one embodiment of an air pressure sensor of the ventilation system. As shown in FIGS. 2a-2b, one or more air pressure sensors 100 are preferably configured to be flushed 104 within an interior side 106 of the duct 16. In this manner, the air pressure sensors 100 preferably do not obstruct the airflow 102 as the airflow 102 is drawn through the duct 12, 14, 16. Because the one or more air pressure sensors are flushed 104, the air pressure sensors preferably do not obstruct the dust or cause air turbulence and do not change air pressure as it travels along at least one of the ducts from the one or more workstations 18 to the dust collector 22.

Determining Air Velocity without an Obstructive Probe

The ventilation system is preferably an air velocity measurement and maintaining ventilation system that preferably includes a sensor for measuring the static air pressure in a duct. The sensor of the ventilation system preferably does not act as an obstacle to the material being transported through the duct, as typical airflow measuring probes generally act as an obstacle to dust as when air flow travels through the ducts. As shown in FIGS. 2a-2b, the sensor 100 of the ventilation system 10, which is preferably an air pressure measurement sensor, may be connected by being flush 104 (or substantially flush) with the wall of the ducts 12, 14, 16, such that the sensor 100 does not interfere with the air or with the transported material (dust). The sensor 100 may be located at a point where it is desirable to have an air velocity measurement, such as the main duct 12 or at the drop 16 to a workstation 18, in the branch ducting 14.

FIG. 2b shows the axis of the tap 108 or opening being preferably perpendicular to the direction of the airflow 102. The tap 108 may be connected to a pressure sensor mechanism 101 with tubing 110. This type of sensor 100 is preferably easy to install, inexpensive, and provides accurate static air pressure sensing at velocities up to 12,000 feet per minute within the ducts 12, 14, 16. For more accurate pressure measurements, the tap 108 should have a sharp, burr free opening. Preferably, the tap 108 should be installed in locations without turbulence, such as locations that are minimally three duct diameters behind elbows, hoods, contractions, and the like.

Preferably, the location of the drop pressure reading points may be located directly within or below a gate 22 in the drop 16. By installing the sensor 100 at the machine side of the gate 22, the zero-pressure reading also indicates when the gate 22 is fully closed and avoids air turbulence potentially caused by the gate 22.

Figure 3:
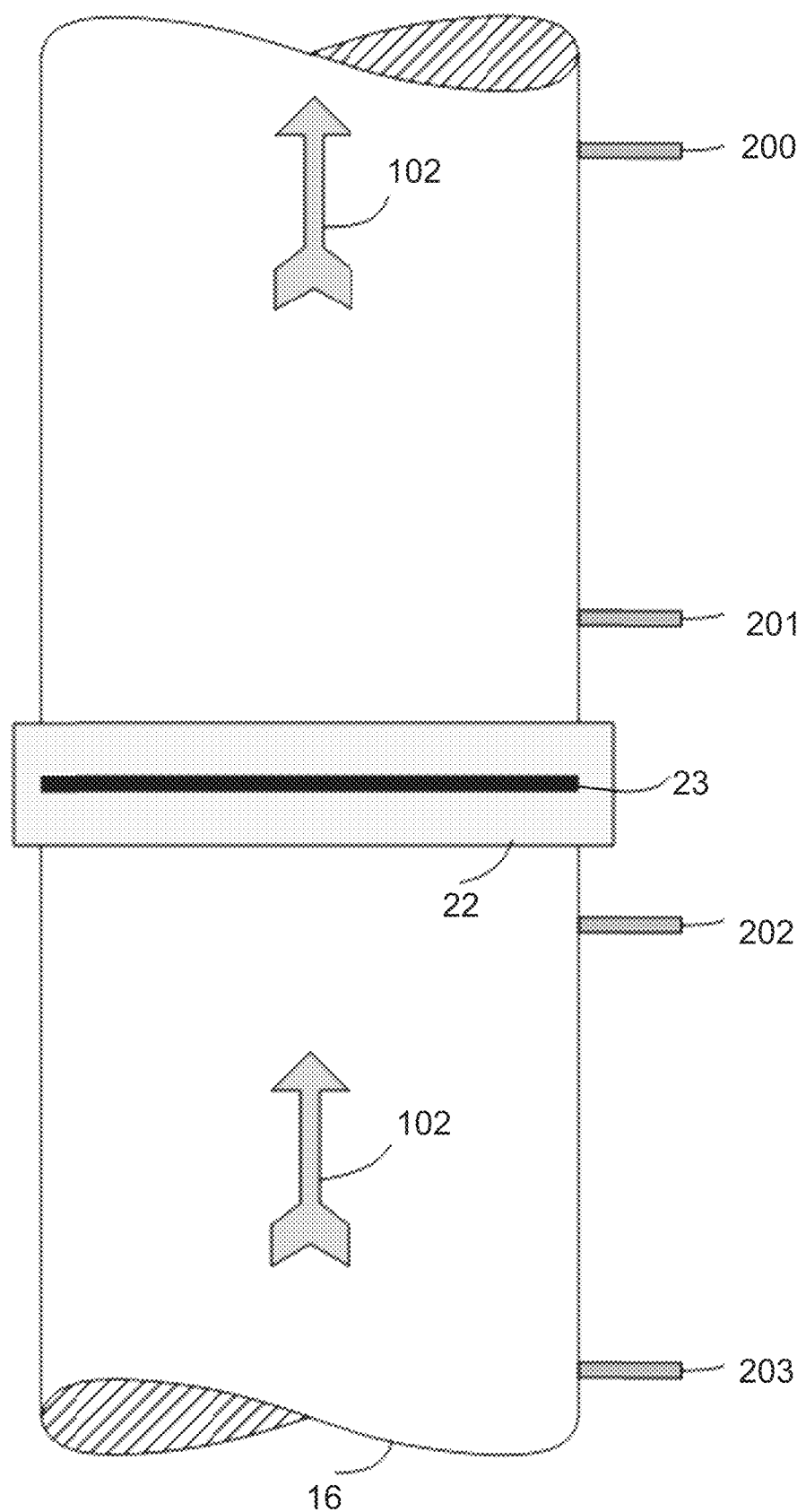
FIG. 3 is a detailed illustration of a section of duct of one embodiment of the ventilation system, showing a gate and possible locations of an air pressure sensor.

FIG. 3 is a detailed illustration of a section of duct of one embodiment of the ventilation system, showing a gate and possible locations of an air pressure sensor. As shown in FIG. 3, the sensor 200, 201, 202, 203 may be placed above the gate 22, below the gate 22, and/or part of the gate 22. The sensors 200, 201, 202, 203 may have openings to read the air pressure inside the duct 16 and outside the duct 16 in order to get a pressure differential. Gate 22 preferably has blade 23, which is used to fully or partially close gate 22. The preferred placement is sensor 201 and sensor 202. The placement of the sensor 201 and sensor 202 directly into the gate 22 may save a lot of work and time during installation of the system. For obtaining a precise air velocity measurement, it does not make a difference whether the sensor 100, 200, 201, 202, 203 is placed inside the gate 22, in front of the gate 22, or behind the gate 22. Testing generally shows that the measurement will be the same regardless of where the sensor 100, 200, 201, 202, 203 is located along the ducts 12, 14, 16. The location, however, is generally considered when calculating the air velocity.

The preferred purpose of taking the pressure measurement is to calculate the air velocity (and air volume, if desired) in the duct 12, 14, 16. In one embodiment, the interpretation of the air velocity from the measured pressure depends upon: (1) the distance of the ducting (at the workstation), (2) the pressure measurement probe is located, (3) the diameter and type of the drop ducting (i.e., metal or flexible), and (4) the type of hood—generally on pressure losses between end of the ducting (hood) to point where pressure sensor is installed shortest 400, short 401, long 402 (shown in FIGS. 4a-4c). This interpretation is generally handled by determining the "calibration constant" for that location.

In another embodiment, a calibration constant may not need to be determined for every location. For example, a calibration constant may only need to be determined where the duct varies in diameter. The calibration constant(s) may be recorded in a control computer and used to calculate air velocity measurements to maintain the ventilation system.

Figure 4C:
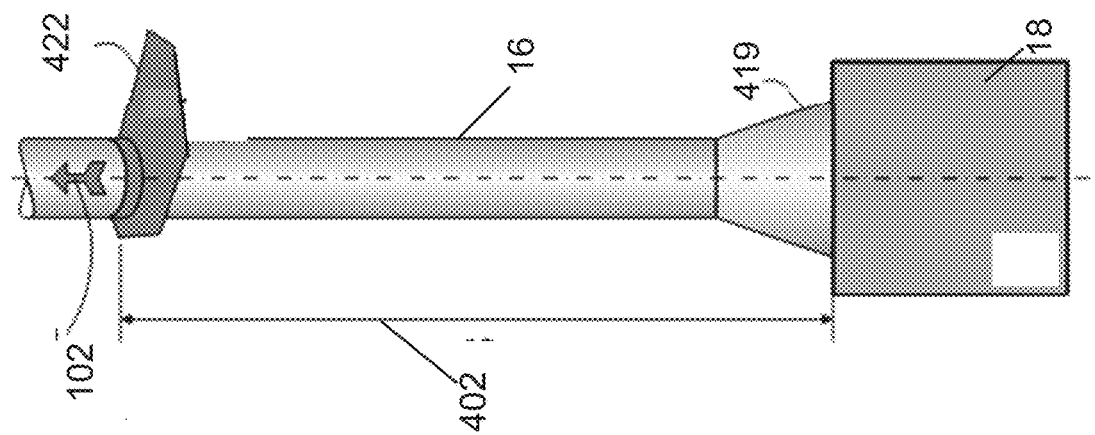
FIGS. 4a-4c are illustrations of one embodiment of the ventilation system and shows the possible locations of the workstation gate and related air pressure sensor.
Figure 4B:
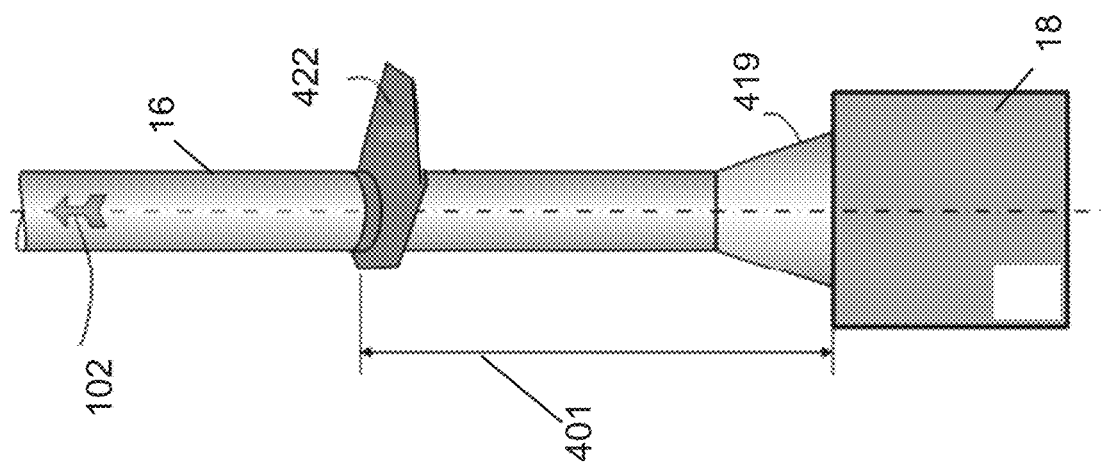
Figure 4A:
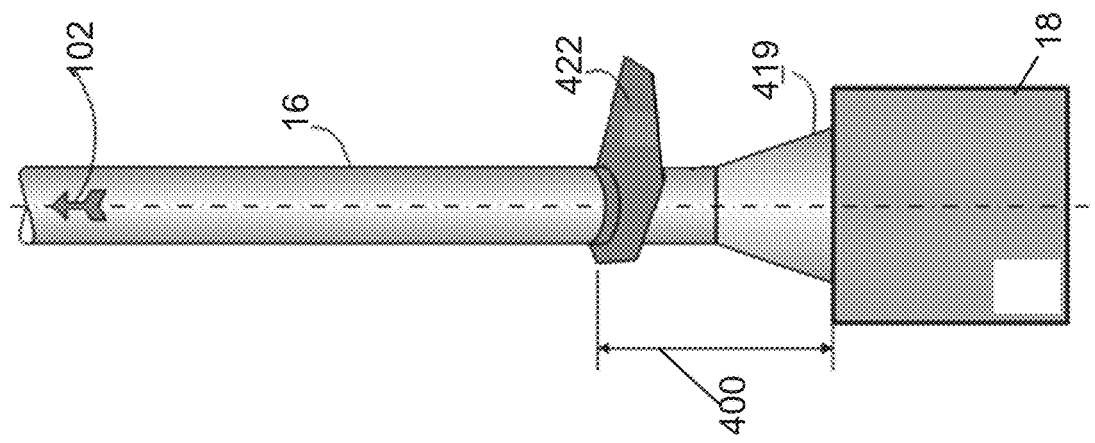

FIGS. 4a-4c are illustrations of one embodiment of the ventilation system and shows the possible locations of the workstation gate and related air pressure sensor. As shown in FIGS. 4a-4c, the gate and pressure sensor 422 may be located at numerous locations along the length of duct 16. FIGS. 4a-4c show that there is a hood 419 between the workstation 18 and duct 16.

The Air Velocity Formula

Figure 5:
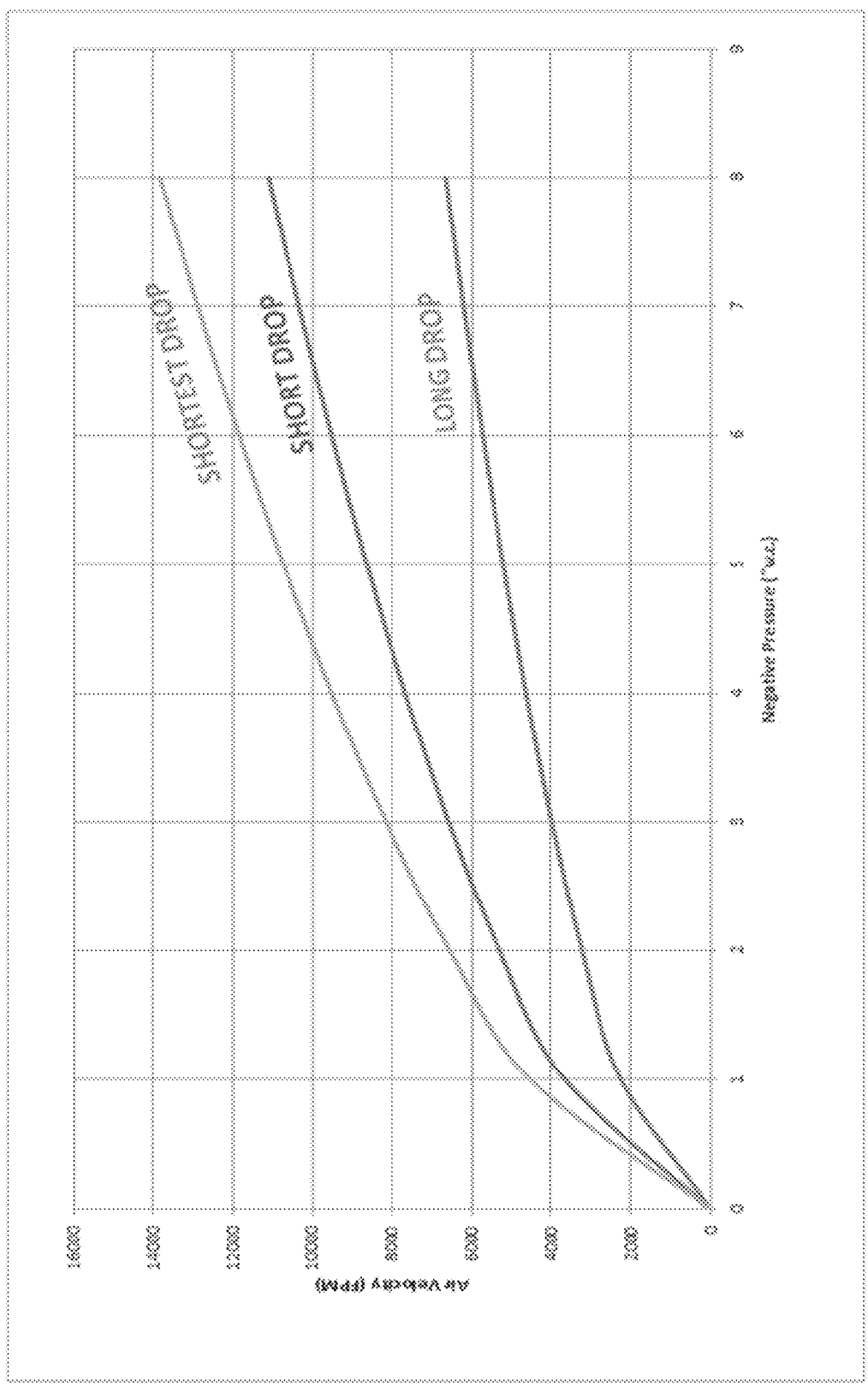
FIG. 5 is a graph that shows the relationship between the static air pressure and air velocity within a duct of one embodiment of the ventilation system and shows how the length of the drop changes the relationship.

In one embodiment, the ventilation system calculates air velocity from the formula (or similar formula that is using calibration constant and pressure to calculate the air velocity):

$$V = K * P^{0.5323}$$ Formula [1] where:

V=air velocity (feet per minute (FPM))
P=measured static air pressure (inches of water column ("w.c.))
K=calibration constant FIG. 5 is a graph that shows the relationship between the static air pressure and air velocity within a duct of one embodiment of the ventilation system and shows how the length of the drop changes the relationship.

Taking the Air Pressure Measurements

In one embodiment, the calibration constant is generally determined for each measurement point. To obtain the calibration constant, it may be necessary to measure the pressure and air velocity at the same time and then use Formula $V = K * P^{0.5323}$ to calculate the calibration constant K. After obtaining constant K, the air velocity meter is removed from the ducting, and the air velocity may be calculated by taking a measurement of the static air pressure using $V = K * P^{0.5323}$. For purposes of high precision, the measurements are taken as many times as possible, preferably at least thirty (30) times, and the results are then averaged.

In one embodiment, the static air pressure measurements and air velocity measurements, which are taken at various locations, including at each of the gates in the drops to the workstations, are transferred—automatically, digitally, remotely, or manually—to a control computer. This control computer preferably calculates and records the K calibration constants.

Figures 7A, 7B:
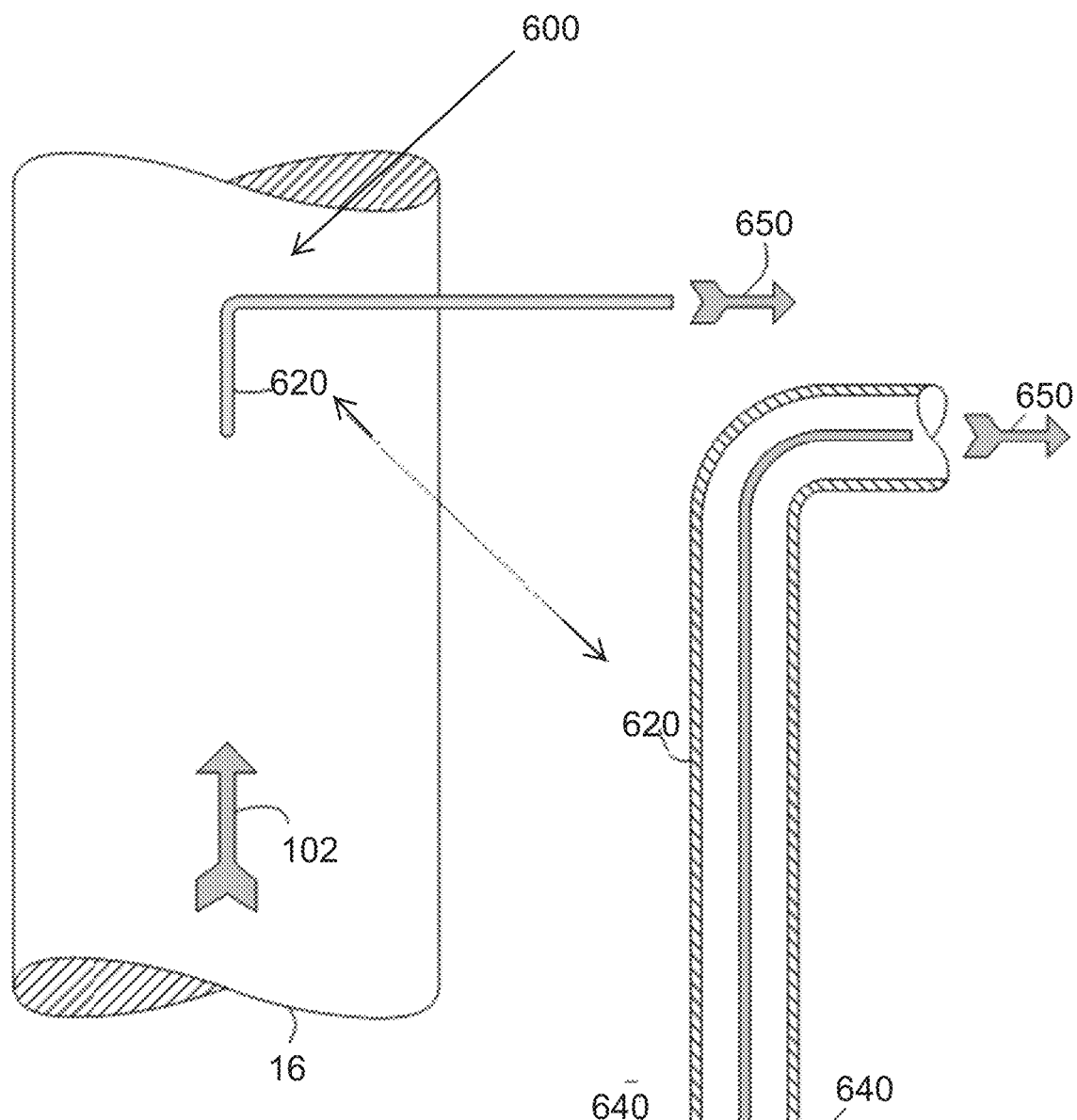
FIGS. 7a-7b are detailed illustrations of an air velocity probe that is used to calibrate one embodiment of the ventilation system.
Figure 7C:
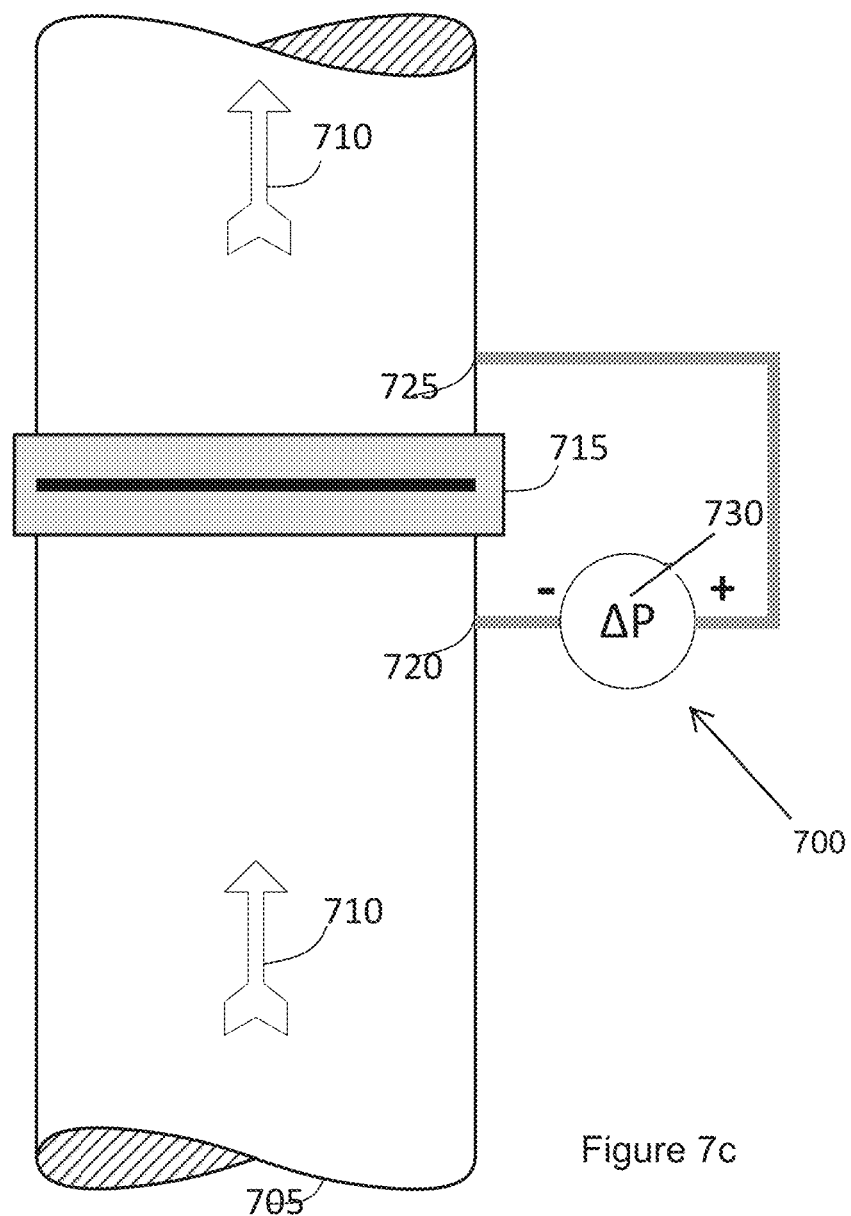
FIG. 7c is a detailed illustration of one embodiment of an air pressure sensor that is used to calibrate another embodiment of the ventilation system.

In another embodiment, to calculate the calibration constant, it may be necessary to measure the difference in air pressure (as shown in FIG. 7c). The air pressure measurements may preferably be taken at either side of a gates (i.e., before the gate and after the gate) and may be transferred—automatically, digitally, remotely, or manually—to a control computer. The control computer may calculate and record an initial calibration constant K. The control computer may store the measurements, thereby allowing the control computer to calculate additional ventilation system values automatically. In a preferred embodiment, for the differential pressure measurement, the calibration contact will be measured only once (in initial setup) and the calibration constant will be recorded in the software of the control computer or in another embodiment the calibration constant will be recorded directly at the gate processor.

Figure 6:
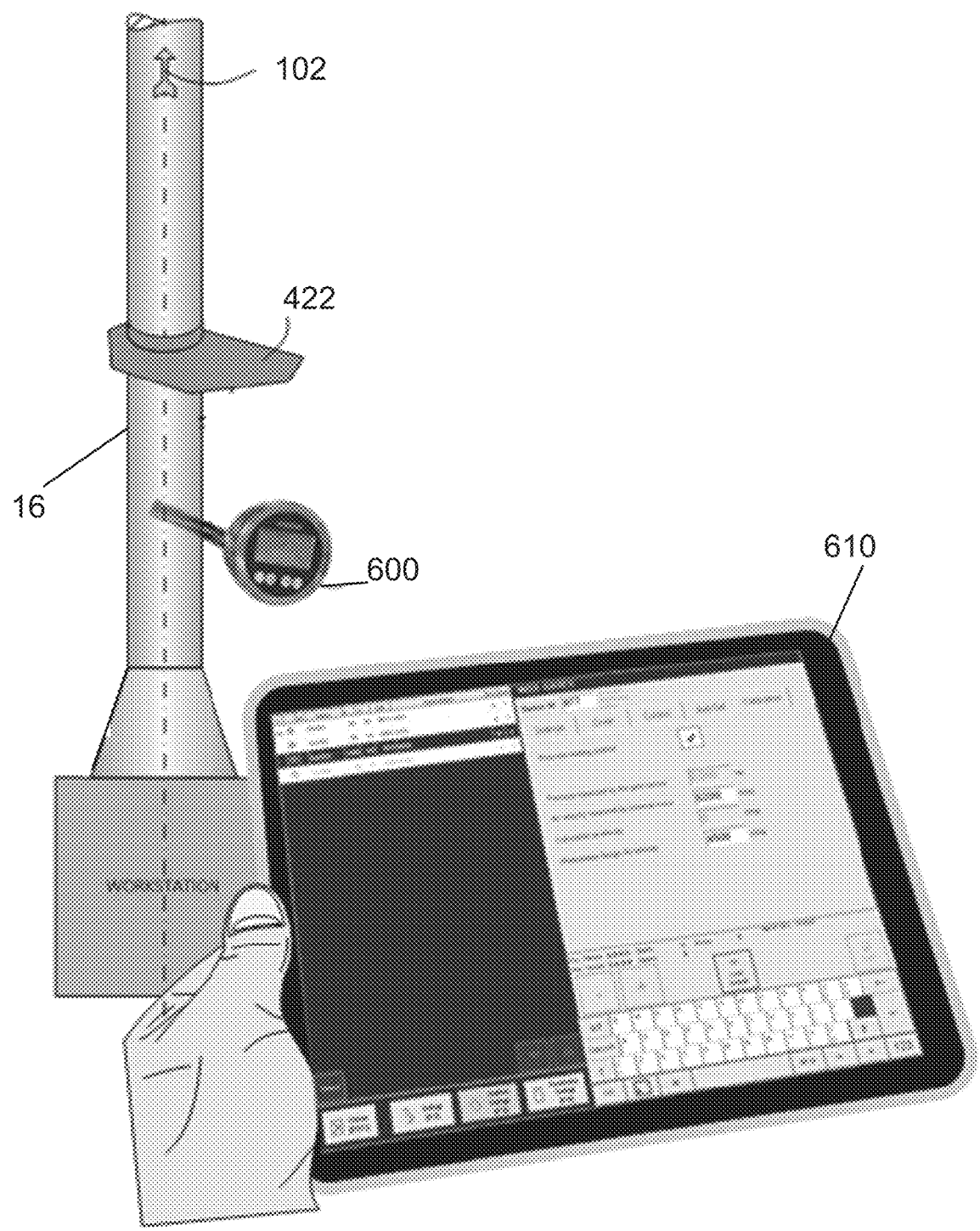
FIG. 6 is an illustration of a duct drop of one embodiment of the ventilation system and show the air velocity being taken by a removable air velocity probe.

FIG. 6 is an illustration of a duct drop of one embodiment of the ventilation system and show the air velocity being taken by a removable air velocity probe. As shown in FIG. 6, measurements of the air velocity may include airflow 102, pressure sensor installed in the gate 422, duct 16, air velocity meter 600, and tablet computer 610. In one embodiment, the K calibration constant is determined by taking the pressure measurement via gate and pressure sensor 422 and the air velocity measurement via air velocity meter 600 (or probe). A fully automated method of calibration may use, for example a tablet computer 610 that may be wirelessly connected to the air velocity meter 600. Here, the user may place the air velocity meter 600 into the duct 16, may select the gate/pressure sensor 422 or other location on the tablet 610, and may take the calibration measurement. The air velocity meter 600 may then transfer the air velocity value to the tablet 610, and the tablet 610 may transfer the value to the control computer 36, which generally automatically calculates the calibration constant K. The pressure value is then generally transmitted from pressure transmitter to control computer 36. Alternatively, the air velocity meter 600 may not be connected to the tablet 610—that is, the user may simply read the air velocity from the meter display and may enter a value to the tablet 610 or control computer 36.

Importantly, testing shows that the calculated air velocity is generally identical to the measured air velocity at a wide range of air speeds. The precision of the described measurement is more than sufficient for evaluating whether the air velocities in the ducting are above or below the necessary minimum transport velocities.

In another embodiment, the air velocity may be calculated without a removable air velocity meter 600. The air velocity may be calculated from the difference in air pressure measurements before the gate and after the gate. The difference in air pressure may then be used to determine an initial calibration constant K. This simplified method of calibration may only require the calculation of one calibration constant for gates installed on ducts of the same diameter. Accordingly, this method may avoid calculation of a calibration constant for every location, regardless of the diameter of the duct. The measurements may be recorded and stored in a control computer and used to calculate additional ventilation system values automatically. In a preferred embodiment, for the differential pressure measurement, the calibration contact will be measured only once (in initial setup) and the calibration constant will be recorded in the software of the control computer or in another embodiment the calibration constant will be recorded directly at the gate processor.

Although several different locations are described where air velocity measurements may be taken, it is preferred that these measurements occur at or close to the gates.

FIGS. 7a-7b are detailed illustrations of an air velocity probe (preferably a Pitot probe) that is used to calibrate one embodiment of the ventilation system. As shown in FIGS. 7a and 7b, the air velocity meter 600 is preferably removable from duct 16, so that the air velocity meter 600 may be removed or inserted for calibration purposes. FIG. 7b shows that the air velocity meter 600 preferably has a probe tip 620 that includes an opening 630 to read velocity pressure and static sensor openings 640. The air flow 650 may be directed to air velocity sensor mechanism, which preferably determines and, preferably records the air velocity measurements.

FIG. 7c is a detailed illustration of an air pressure sensor that is used to calibrate another embodiment of the ventilation system. As shown in FIG. 7c, an air pressure sensor 700 may be configured to be near a gate with two ends or hoses 720, 725 that are flush within an interior side of the duct 705. In this manner, the air pressure sensor 700 preferably does not obstruct the airflow 710 as the airflow 710 is drawn through the duct 705. Because the air pressure sensor 700 is flush, the air pressure sensor 700 preferably does not obstruct the dust or cause air turbulence and the ends/hoses/openings 720, 725 themselves do not themselves cause a change in air pressure as it travels along the ducts from the one or more workstations to the dust collector. The air pressure sensors 700 may be located at a point where it is desirable to have an air velocity measurement, such as substantially near a gate 715. Preferably, the air pressure sensor 700 may comprise two ends, hoses, or openings 720 and 725, so that the sensor 700 may read air pressure measurements before and after the gate 715. The difference in air pressure 730 may then be used to calculate the air velocity based on the formula or the table built-in the control computer or at the processing unit at the pressure sensor (or at the gate).

The embodiment shown in FIGS. 6 and 7a, may require that the air velocity be measured with the external meter/sensor, as shown in FIG. 6, and that measured value is entered to the control computer. The embodiment shown in FIG. 7c preferably does not require such calibration with the external air velocity meter. This simplifies installation and setup of the system, if the sensors shown in FIG. 7c are installed system wide. This embodiment allows the creation of software for the control computer to setup the system ventilation values (air velocities) fully automatically. Another advantage of this embodiment is that the system will maintain ventilation values, even if the system losses are changed, such as those caused by (a) clean or dirty filter losses, or (b) winter or summer operation. During winter operation the clean air may be returned to the building via additional filter that will increase pressure losses. Another advantage of this embodiment is that installation time is saved because it is not necessary to calibrate the air velocity reading for every installed gate for every installed workstation. This makes the installation more cost effective.

In the embodiment shown in FIG. 7c, the pressure/velocity measurement will only require each model of the gate for different diameters of the duct to be calibrated once, during research and development/initial set-up. Subsequently these measurements will be included in the control computer in the form of a conversion table or as a formula. The measurements, may be recorded and stored in a control computer and used to calculate additional ventilation system values automatically.

Displaying the Air Velocities and Air Volumes

The measured air velocities are preferably displayed in various text and graphic forms at the displays that are connected to or linked with the central computer. The preferable method is to display air velocities as a graphical representation of a duct-layout/ventilation system on the computer screen(s) or display(s) that are connected to or linked with the system. This graphical representation of the ventilation system preferably mimics the real duct layout of the factory, so that a user may quickly see the performance of the system at each location. This is preferably the easiest way for a user to understand air velocities throughout the entire system. In addition, the display is preferably color-coded to aid the user in quickly recognizing inadequate velocities. In one embodiment a green background may signify air velocities within the proper range; a red background may indicate low air velocity; and a blue background may represent air velocities that are too high.

Figure 8:
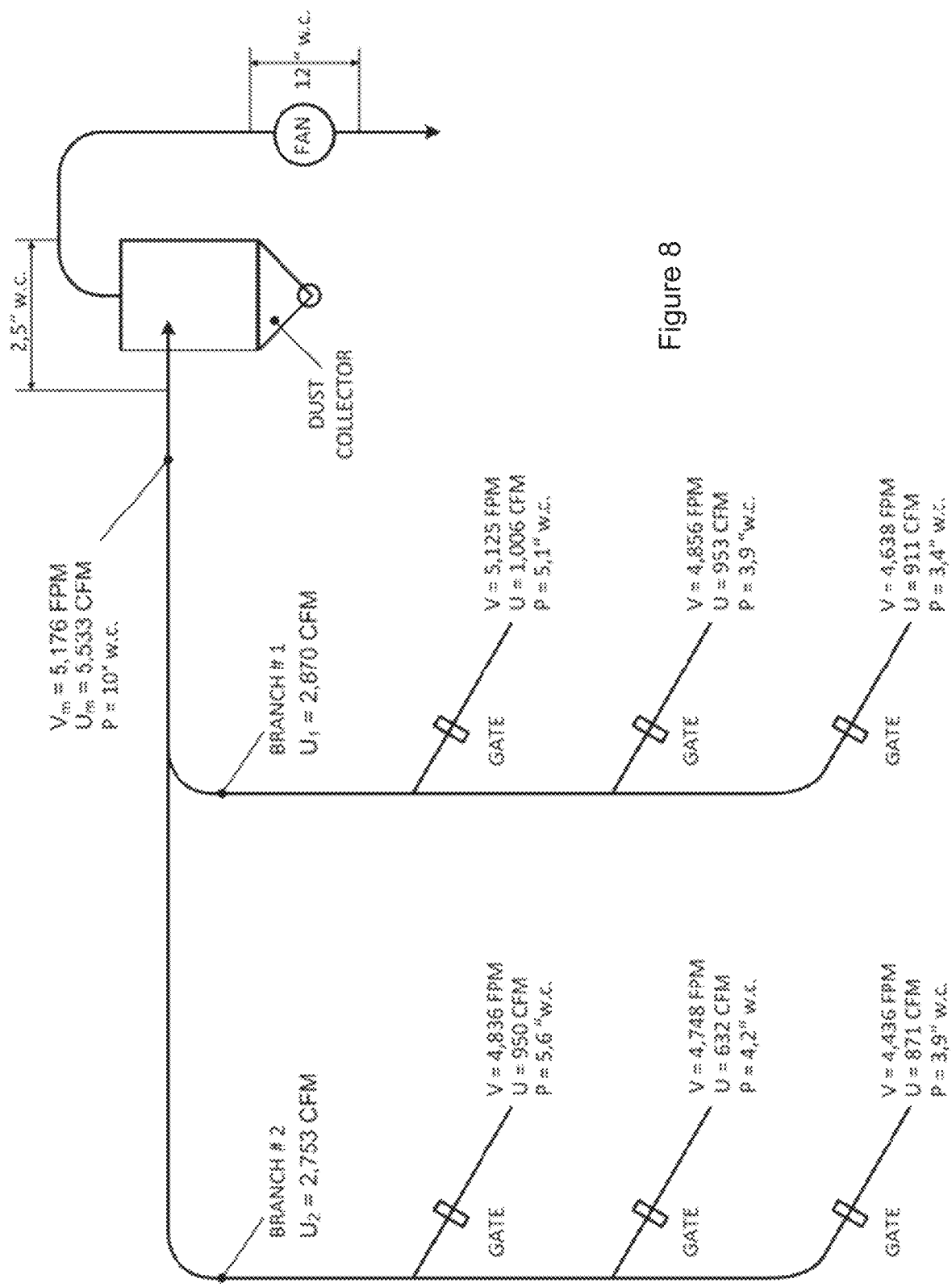
FIG. 8 is a schematic illustration of one embodiment of the ventilation system and shows possible air pressure, velocity, and volume measurements throughout the ventilation system.

FIG. 8 is a schematic illustration of one embodiment of the ventilation system and shows various air flow statistics throughout the ventilation system as might be displayed on the computer screen(s) or display(s) of the ventilation system.

The Air Volume Formula

The control computer 36 may also display values of the air volume at each measurement point, such as the gates or drops, by using the duct diameter (preferably entered during system setup by user) and by using the following formula:

$$U=A*V \qquad \text{Formula [2]}$$

wherein:
U=Air Volume (cubic feet per minute (CFM))
A=area of the particular duct (square feet (sqft))
V=Air Velocity (FPM) (Calculated)
wherein:
A is generally calculated from the duct diameter through the following formula:

$$A=\pi(d/2)^2 \qquad \text{Formula [3]}$$

wherein:
D=the diameter of the duct at the measurement point (feet)

Displaying air volume instead of or in addition to the air velocity is helpful in certain industries, such as the pharmaceutical industry, where design values are typically specified in air volumes.

Closing and Opening the Gates

The gates used within the on-demand ventilation system may be based on various principles. One embodiment may use pneumatically operated gates, with linear or rotating blades while another embodiment may use electrically operated gates, with linear or rotating blades. Other industries typically use "butterfly" gates. Thus, despite the type of gate that is used, any gate may be used by the ventilation system, so long as they can be open and closed automatically.

The preferred location for installing the static air pressure probe is the collar of the gate. The collar of the gate is used to connect the gate to the duct system. Preferably, the pressure probe is installed on the machine-facing collar, as opposed to the fan facing collar. When installed this way, the pressure reading preferably drops to zero when the gate is closed. This preferably indicates that the gate is properly and fully closed, which aids in detecting gate errors. Additionally, some industries that handle poisonous gasses, dangerous substances, or controlled substances require positive confirmation of proper ventilation, which is typically aided by having the pressure sensor installed in the machine-facing collar to confirm the flow when the gate is open. Another embodiment of the pressure measurement can be done between both gate collars. This approach may allow the system to calculate the air velocity without the calibration of the external air velocity meter.

Because the maximum benefit for the measurement of air velocities is obtained if the air velocities are measured at each drop and branch of the duct system, the pressure sensors are preferably connected at the gate's electronics. If the gate is not using an electronic board, the pressure sensor may be connected to a standalone electronic board. The gate electronic board (or the standalone controller) preferably communicates with the central control computer. Further, the gates in on-demand ventilation systems are typically connected to the central control unit, and can transfer data to the central control unit, typically via various types of the wired field bus industrial protocols, or industrial wireless protocols.

Figure 9:
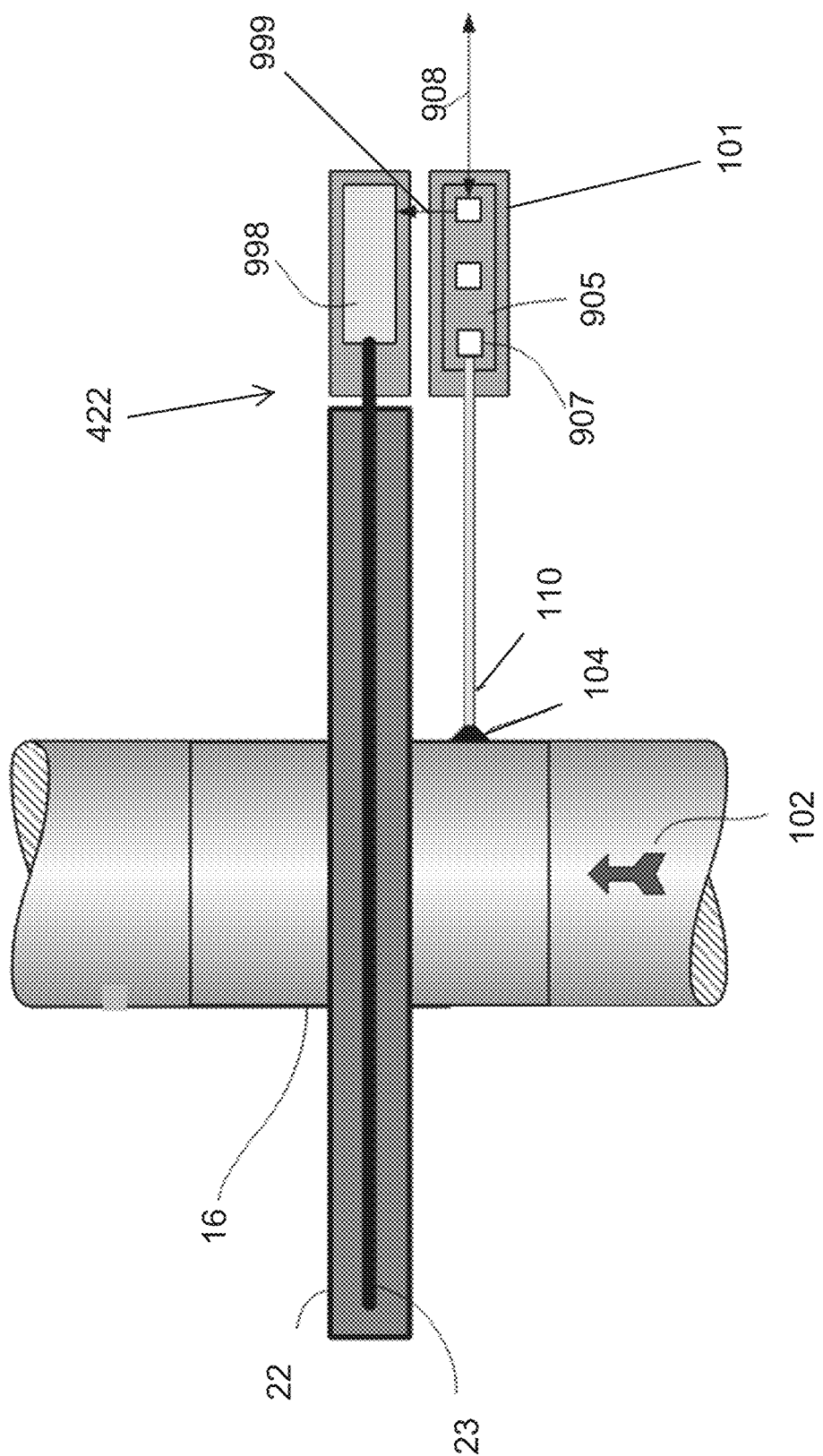
FIG. 9 is an illustration of a one embodiment of a gate and air pressure sensor of one embodiment of the ventilation system.

FIG. 9 is an illustration of a one embodiment of a gate and air pressure sensor of one embodiment of the ventilation system. As shown in FIG. 9, the gate and air pressure sensor 422 is preferably comprised of gate 22, blade 23, air pressure sensor mechanism 101, tubing 110, flush mount 104, blade motor 998, control board 905, air pressure sensor device 907, and connection 908 to control computer 36. The control computer 36 may control blade motor 998 through connection 999.

Maintaining Minimum Air Velocity

The central control computer generally uses the measured air velocity/air volume values to adjust the system to exhaust the required air volume and to maintain proper air velocities in each part of the duct system. The required air velocity/air volume for each workstation and for the duct system is preferably entered into the computer, and the required air velocity/air volume may also be calibrated based upon relevant standards, regulations, and legislation governing the material being ventilated and/or worked on at the work station. The branch diameters and the main duct diameters may also entered into the control computer, and the system preferably has activity sensors, which are preferably connected to all the workstations, to inform the system as to which workstations currently require ventilation. For example, when the system is on, pressure measurements may be taken from the various locations of the pressure sensors within the system. Using Formula $V=K*P^{0.5323}$, the air velocity is calculated at each sensor. Also, when using Formulas $U=A*V$ and $A=\pi*(d/2)^2$, the control computer may determine the air volume at each location. The air volume (or air velocity) is generally then compared to the minimum air volume (or velocity) required by the standards, and if the calculated volume or velocity at any location is less than what is required, the control computer may recognize this and adjusts the fan and gates, accordingly—that is, to increase the air volume or velocity. Conversely, if the air volume or velocity is too great, and thus, energy inefficient, the control computer may recognize this and adjusts the fan and gates accordingly. The description how the control computer adjusts the gates and the fan speed is detailed below.

In addition to determining the volume of air flow needed at each sensor location, the control computer may also calculate the total air volume currently required by the system using the following equation:

$$U = \Sigma_{i=1}^{n} S_i \cdot U_i \qquad \text{Formula [4]}$$

where: Si=logic value (0 or 1) of the workstation activity sensors (on or off)
Ui=minimum required air volume of that work station
n=total number of workstations in the system This generally allows the control computer to determine the baseline fan speed depending on how many workstations are in use.

Figure 10:
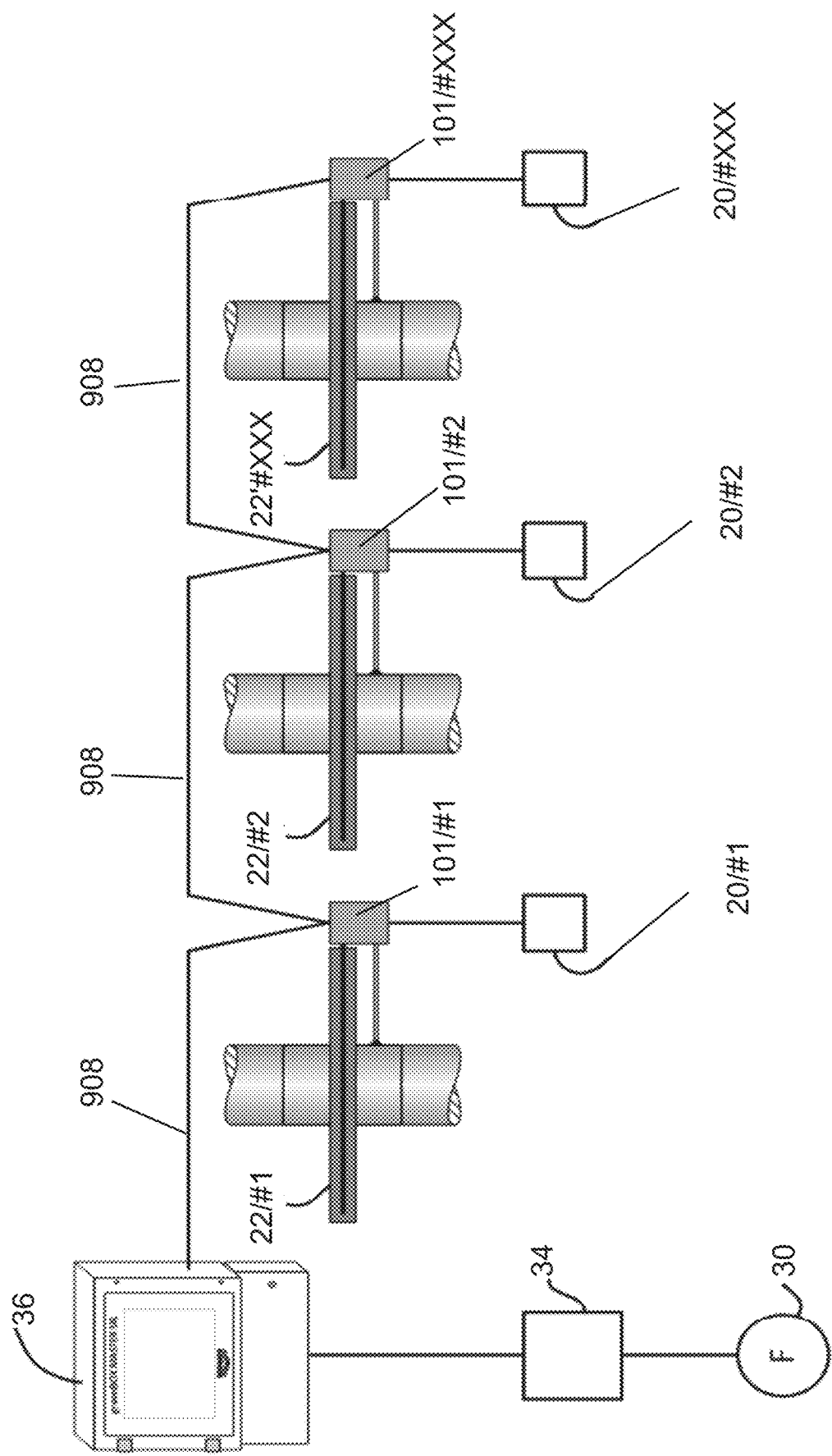
FIG. 10 is an illustration of one embodiment of the ventilation system and shows how the control computer automatically adjusts the gates and fans to ensure that the air flow is kept above the minimum required.

FIG. 10 is an illustration of one embodiment of the ventilation system and shows how the control computer automatically adjusts the gates and fans to ensure that the air flow is kept above the minimum required. As shown in FIG. 10, the system preferably includes fan 30, variable frequency drive 34, control computer 36, gates 22 (#1, 2, and XXX), air pressure sensor mechanisms 101 (# s 1, 2, and XXX), workstation activity sensors 20 (# s 1, 2, and XXX), and connections 908. FIG. 10 shows how the central control computer 36 is able to control the gates 22 and fan 30 to keep the air flow above the minimum and keeps the system energy efficient. XXX herein means that very high number of the gates (workstations, pressure sensors) can be connected and/or used in one ventilation system.

Method of Calculating Air Velocities in Every Part of the Duct System Based on Measurements at the Duct Outlets The air velocity in every part of the duct system may be calculated if the air velocity at each duct, the duct diameters, and the manner in which the ducts are connected together (i.e., the duct system topology) are known. One of the methods to store and model the duct system branching layout in a control computer is preferably a Tree Data Structure, which is well known in the art. A Tree Data Structure is generally a hierarchical tree structure, with a root value and sub trees of children, represented as a set of linked nodes.

Figure 11:
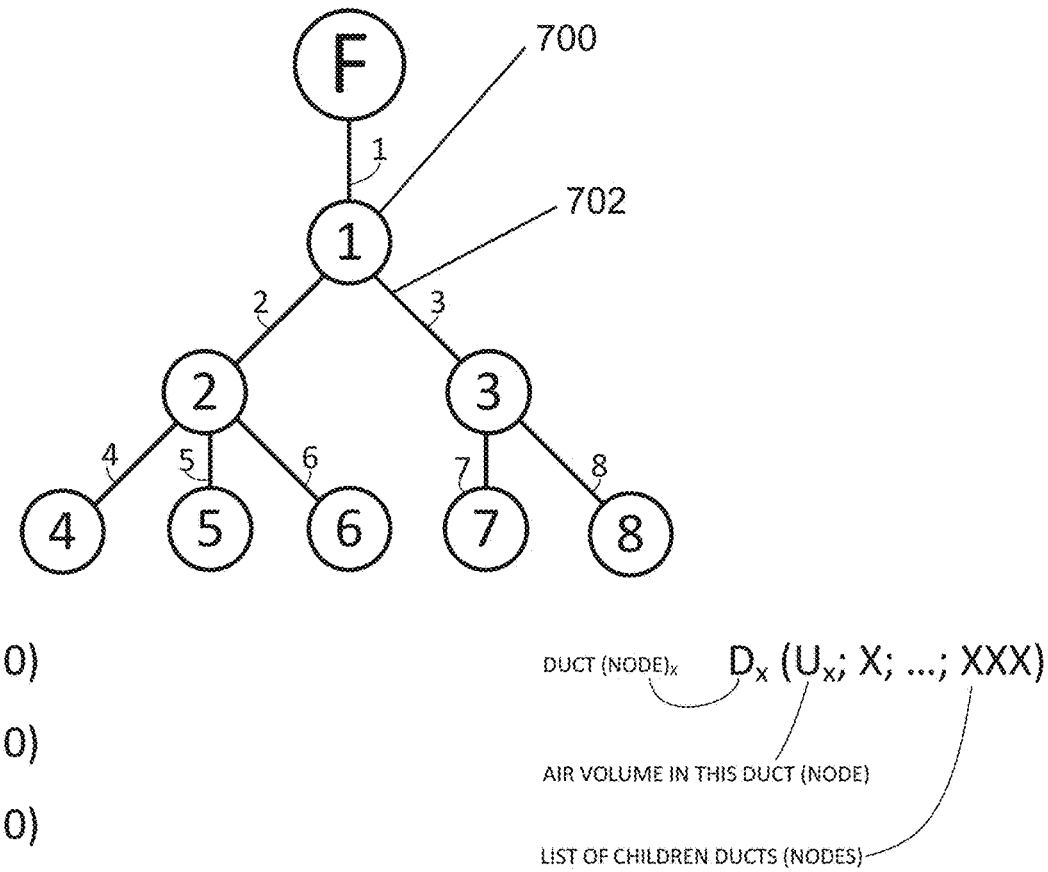
FIG. 11 is a ventilation duct topology illustration of one embodiment of the ventilation system based on the Tree Data Structure.

FIG. 11 is a topology illustration of one embodiment of the ventilation system based on the Tree Data Structure. As shown in FIG. 11, circle nodes 700 (F and 1-8) and links 702 (1-8) form a hierarchical tree structure, with a root value and sub trees of children. In this configuration, each node 700 (F and 1-8) generally represents a branch of ducting and is usually defined by the value of air velocity and air volume together with a list of connected child nodes. Circle node F is the exhaust ventilation fan and circle node 1 is the main duct, or root node. Each node generally represents the branch of ducting leading from itself to its parent node, and each node may be defined by the value of air velocity and air volume. However, other considerations may be included, such as duct diameter. Each node in FIG. 11 may be shown together with a list of connected child nodes, if any. As shown in FIG. 11, child nodes 700 #7 and 700 #8 represent two outlets (typically, drops to workstations) of the duct system, with no children ducts connected to them. Because the system preferably measures the air velocity at each duct outlet and may calculate air volume, both the air velocity and air volume at nodes 700 #7 and 700 #8 are known, which allows the air velocity and air volume at node 700 #3 to be calculated using the following formula: U3=U7+U8. The air velocity at node 700 #3 can be calculated from U3 and node 3 diameters. By applying this method, we can calculate the air volume and air velocity in every node (duct) of the entire system up to the main duct and fan. As shown in FIG. 11, it is preferred that no reference to a child node is duplicated and no reference points to the root. The FIG. 11 shows that measured values of the air velocity at each drop and known dust system topology allows calculating the air velocities in each part of the duct system.

Method of Closed-Loop Regulation Using a Central Control Computer

As discussed above, the air velocities and/or air volumes are known (via measurement or calculation) in every part of the ventilation system. These known air velocities and/or air volumes are used within an on-demand ventilation system that close (or open) gates at non-active workstations, with the goal of maintaining air velocity and saving electricity on the operation of the exhaust fan (and on make-up air, if air-conditioning is used—because with on-demand system less air is exhausted out of building then less of make-up air system can be produced; the make-up air savings is significant in certain industries such as pharmaceutical industry where make-up air must be extremely clean and is very expensive). Because closing various gates reduces the total required air volume, and thus, energy use of the system, it is preferred that two conditions be fulfilled:

a. First, the minimum air velocity in the entire duct system must be maintained to avoid material/dust settling and becoming a hazard.

b. Second, the air velocity at the outlets (drops) should be above the recommended drop velocity of the material/dust being transported so as to provide effective ventilation.

Generally, the minimum dust transport velocity and the outlet velocity values differ from each other, with the minimum transport velocity generally being lower. For example, the minimum transport velocity for fine dry sawdust is generally 3,500 FPM, while the recommended outlet velocity is 4,500 FPM. These are simplified example values, and the actual velocity values may differ. Although the ventilation system preferably works with air velocity at any velocity, for practical purposes, the air velocities in the main duct and branch ducts are generally at least above the minimum transport velocity of the dust/material, for example 3,500 FPM (for dry fine sawdust). Air velocities in the main duct and branch ducting above 6,500 FPM are impractical because the pressure losses become too high for the installed fan.

Before the on-demand ventilation system is operated in automatic mode, the calibration and mapping routine may be performed. During the calibration routine, the fan and system curves (shown in FIG. 12) should be measured and the system may be optimally mapped to the fan curve. The calibration data is preferably evaluated for a match between the fan curve and the system curve; the fan may also be evaluated for maximal air volume necessary to operate all workstations above the minimum air flow requirements throughout the ventilation system. The static pressure stall region of the fan may also be measured. The fan, preferably, should not be operated in this area due to excessive vibration and noise which generally represents a danger and may destabilize the entire ventilation system. If proper mapping is not possible, the ventilation system may inform the user that the ventilation system may not unable to be used in the automatic mode. The control computer in a first step measures the system curve with all gates open (as shown in FIG. 13). The control computer may open all gates and increase fan RPM from minimal speed to maximal speed in the increments for example 1 Hz At each step the control computer will measure air volume and fan total pressure as shown in FIG. 13. Then the control computer will repeat the same system curve measurement with a certain percentage of the gates closed. For example, four different system curves can be measured for four different percentages of the gates closed to model how the dust collecting system will typically be used. Alternatively if the duct system uses several major branches, the measurement may be taken with only branch #1 open and a second measurement only with branch #2 open, and so on.

The system curves are mathematically simple, therefore they can be modeled formula $P=L*e^{MU}$ where P is pressure, L and M are constants and U is measured air volume. The sets of the system models can be used for the safety mode as described below.

The next step is preferably the measurement of the fan curve at full fan speed and with all gates open. The control computer will keep taking this measurement at the same fan speed (for example 60 Hz) and will start closing gates one by one and measure in each change in air volume and fan total pressure. This step will be repeated by using different fan speeds, for example, the fan curve may be measured at 60, 50, 40, and 30 Hz.

After measuring the system and fan curves, the control computer determines the best mapping of the system to the fan curves. As a first step during mapping system will open all gates and will change the fan curve (fan speed) until the required air volume will match measured air volume, then the control computer will close, for example, 10% of the gates, and then the control computer will again determine at which fan curve the measured air volume matches the required air volume. These selected fan curves will preferably be used in the safety mode as described below. The safety mode is not using close-loop regulation, but a predetermined open-loop regulation.

The ventilation system is preferably designed so that when all of the workstations are active, and thus, all the gates open, the outlet air velocities should be optimal and balanced (i.e. at the required values at each outlet). With all of the gates open, it is generally practical for the on-demand ventilation system to use high air velocities in the main duct and branch ducts. For example, in the woodworking industry, the practical maximum air velocity in the main duct with all gates open may be 6,500 FPM. Using high velocities in the main duct and branches with all gates open generally increases the pressure losses but generally allows the system to operate with lower air volume when only some of the workstations are active. Choosing a proper range of air velocities for the ventilation system is a balancing act wherein some the most critical information to know is the average and peak utilization of the workstations. The preferred goal is generally to ensure that the ventilation system is the most energy efficient most of time. For example, if the average utilization of the workstations is low (e.g., 50-60%) it may be preferable to use higher air velocities in the main duct and branch ducts when all gates are open. If the average workstation utilization is relatively high (e.g., 80-90%) it is usually better to use lower air velocities when all gates open.

Figure 12:
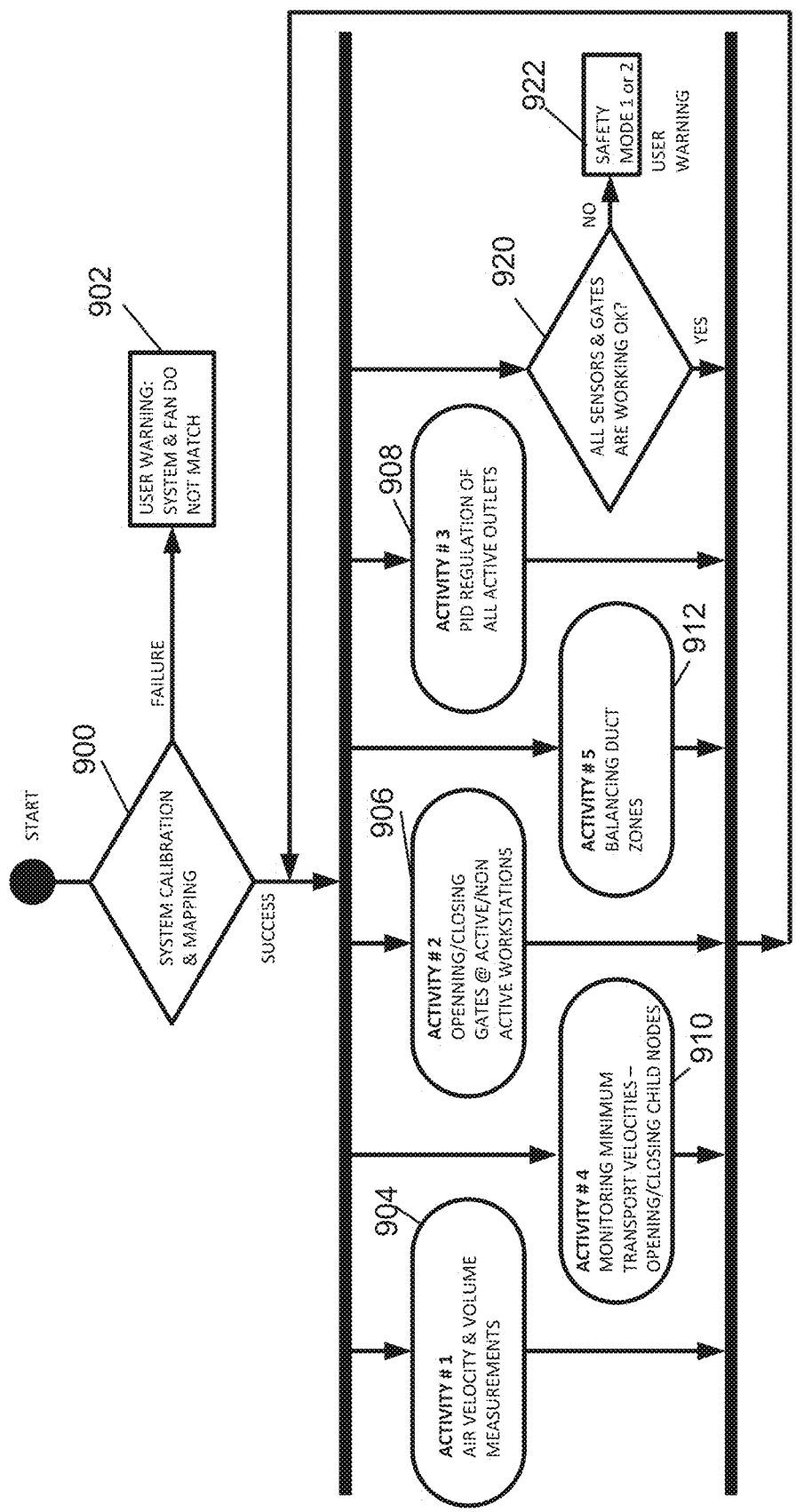
FIG. 12 is a UML (Unified Modeling Language) software diagram of one embodiment of the central control computer of the ventilation system.
Figure 13:
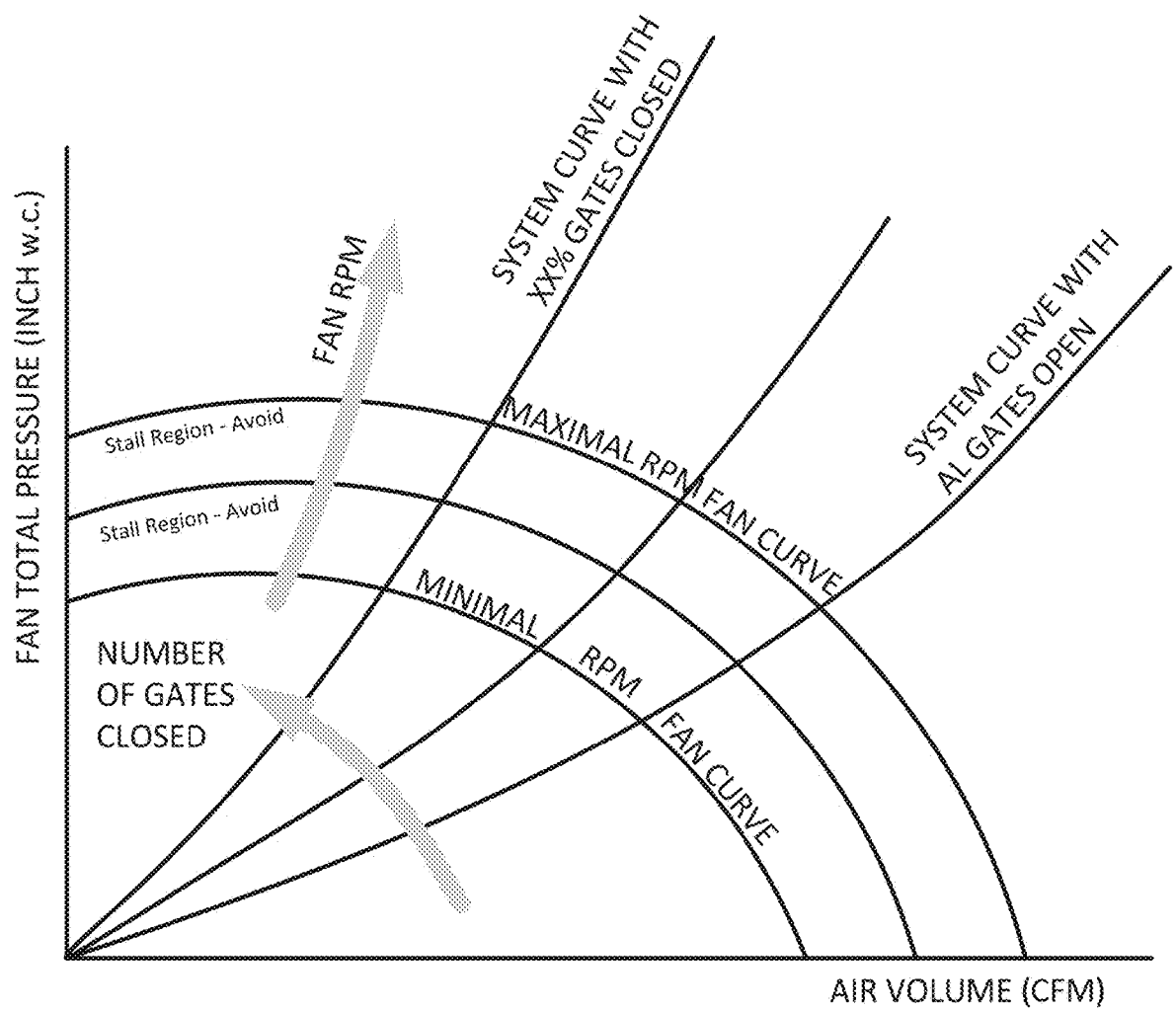
FIG. 13 is a graph showing the system curves and fan curves that are measured and used by central control computer of one embodiment of the ventilation system.

Regulation of the Ventilation System for Times when not all Workstations are being Used FIG. 12 is a flow block diagram of one embodiment of the ventilation system. As shown in FIG. 12, the closed-loop regulation method to achieve proper air velocities at outlets and in the entire duct system preferably is comprised of the activities, or steps, which are preferably executed at control computer in parallel (at a same time): (1) measure and/or calculate the air velocity and volume in each part of the duct system 904; (2) opening/closing gates at active/non-active workstations 906; (3) regulating all active duct outlets 908; (4) monitoring minimum transport velocities 910; (5) balancing duct zones 912; (6) verifying all sensors and gates 920; and (7) warning the user 922 if necessary. FIG. 12 also shows that these regulation steps, or activities, may be executed in parallel and preferably at the central control computer. As shown in FIG. 12, the system is generally initially calibrated and mapped 900. If there is a calibration failure, the system warns the user of the failure, such as that the fan and system do not match 902. The system calibration and mapping is described above.

Once calibration is successful, the first step or activity (it is preferable refer to the steps as activity, because the steps are not necessarily completed in succession, but may be done in parallel) or activity is to measure and/or calculate the air velocity and volume 904. This is preferably is done in accordance with the measurement and calculation methods described herein. In the second step, the control units generally opens and/or closes the gates at the active and/or non-active workstations 906; wherein the active workstation is generally open, and the non-active workstation is generally closed. The third step generally involves regulating all active outlets 908. The PID (proportional-integral-derivative) generally regulates the system, and the control computer monitors all outlet air velocities. These air velocities are preferably one or more measured and/or calculated values as described herein. The outlet air velocities are preferably above the required minimum outlet air velocity, and if any outlet air velocities are below the minimum, the speed of the fan is preferably increased. Alternatively, or in conjunction, the control computer may partially close one or more gates at outlets with higher than desired outlet air velocities. Partially closing one or more of the gates may likely increase pressure losses at these outlets, and, thus, redirect air to outlets with lower air velocities. This approach is generally available only for use with very fine dust or fumes (therefore applicable in certain industries such as pharmaceutical, welding), wherein the partially closed gate will not cause material jamming inside the ducts. If the air velocities in all of the outlets are too high, the fan speed is preferably decreased. Decreasing and increasing air velocities may preferably be based on proportional-integral-derivative controller regulation to eliminate, substantially eliminate, and/or reduce the system's oscillation. In the fourth step (i.e., monitoring minimum transport velocities 910), the system generally monitors the minimum transport velocities by opening and/or closing workstation gates (child nodes). In the event that the number of active workstations causes the air velocities in certain parts of the ducting of the ventilation system to drop below the minimum transport air velocity, the central control computer preferably opens gates on non-active workstations at children nodes. This generally involves the child nodes that are closest to the ducting with the inadequate air velocities. In step 5 (i.e., balancing duct zones 912), the system generally balances the duct zones 912. Specifically, if the air velocities in two neighboring branches of ducts differ (e.g., one duct being too high while the other duct is too low), the system may close, partially or fully, some other additional open gates that are located at non-active workstations. This generally increases the pressure losses in that branch, resulting in a higher air flow into the other branch. The system may include another step or activity, which is not shown in FIG. 12 because this step or activity is generally undertaken only when a small percentage of workstations are active. Specifically, the appropriate air volume generally may be achieved at a relatively low fan speed. A low fan speed, based on fan curves, may lead to inadequate total fan pressure to overcome the system pressure loses, and in this case, it may be possible to increase the fan speed to move to a higher level fan curve, wherein the fan generates a higher total pressure. This, in turn, may increase the electricity consumption of the fan, but generally only insignificantly, thereby reducing energy consumption.

FIG. 12 also shows that it may be preferable to add two additional safety modes that are enabled in case of error, which may reflected in step 6 and step 7 (i.e., verifying all sensors and gates 920 and warning the user 922, respectively). In these steps, the system preferably verifies that all gates and sensors are working. If the system determines that one of the gates or sensors is not working properly, the system will preferably issue a warning and put the system into Safety Mode 1 or 2. Similar safety modes are built-into the control units for car engines, and if some sensors are not working properly, the control unit will preferably allow the car to be used in safety mode—and drive home or to a service center with limited maximal engine output. If the central computer cannot get reliable measurements from a sensor, however, the control computer will switch to Safety Mode 1. Specifically, in Safety Mode 1, the system generally adjusts the fan air volume based on a percentage of the gates currently open (this mode maps the system curve to fan curve during the initial calibration and mapping routine) and an algorithm that opens a certain percentage of the gates in each duct zone to maintain minimum air flow is preferably used. By using Safety Mode 1, the system may be operated until the malfunctioning sensor can be repaired or replaced.

On the other hand, Safety Mode 2 is more radical. In Safety Mode 2 the system opens all gates and generally operates the fan at maximum speed. In this configuration, the system is operated like a standard exhaust ventilation system, and the proper air velocities are set by proper design of the duct system by matching the fan curve to the system curve, as shown in FIG. 13.

FIG. 13 is a graph showing the fan curves and system curves (the fan curves and system curves are official names of these measurements/charts) of air volume to fan total pressure of one embodiment of the ventilation system. As shown in FIG. 13 the fan curves are shown plotted against the system curves ranging from all gates open to some percentage of gates closed. Specifically, the more gates that are closed, the higher the total fan pressure. The system curves and fan curves are measured in the initial system calibration and mapping procedure as described previously and used for system regulation in safety modes 1 and 2.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. The disclosed embodiments capable of modifications in various obvious aspects, all without departing from the spirit and scope of the protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope. It is intended that the scope or protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. An air pressure measuring ventilation system, comprising:
   at least one duct;
   at least one motorized exhaust fan;
   a dust collector;
   one or more workstations;
   a control computer;
   one or more gates; and
   one or more air pressure sensors;
   wherein said at least one motorized exhaust fan is configured to draw air through said at least one duct;
   wherein said one or more air pressure sensors are located on a side of said at least one duct such that an air pressure is measured as said air is drawn through said at least one duct, such that one or more air pressure measurements are generated;
   wherein said one or more air pressure sensors are substantially flush with an interior side of said at least one duct and do not obstruct said air as said air is drawn through said at least one duct;
   wherein said ventilation system is configured to ventilate a dust that is generated at said one or more workstations;
   wherein said one or more air pressure sensors do not obstruct said dust as it travels through said at least one duct from said one or more workstations to said dust collector;
   wherein said one or more air pressure measurements are used to calculate a plurality of calculated air velocities;
   wherein said plurality of calculated air velocities are sent to said control computer;
   wherein said one or more gates are positioned along said at least one duct between said one or more workstations and said dust collector;
   wherein said control computer is configured to control an opening and a closing of said one or more gates and to control a speed of said motorized exhaust fan;
   wherein said control computer is programmed with a plurality of minimum air velocities that must be maintained, depending on a material being transported by the system;
   wherein said control computer compares said plurality of calculated air velocities to a relevant minimum air velocity and determines if any of said plurality of calculated air velocities is less than said relevant minimum air velocity;

wherein said relevant minimum air velocity is dependent on said material being transported by the system; and wherein if any of said plurality of calculated air velocities is less than said relevant minimum air velocity, said control computer adjusts said one or more gates and adjusts said speed of said at least one motorized exhaust fan such that said plurality of calculated air velocities are raised to above one or more of said plurality of minimum air velocities that must be maintained.

2. The air pressure measuring ventilation system of claim 1, wherein said control computer is configured to adjust said one or more gates and adjust said speed of said motorized exhaust fan if any of said plurality of calculated air velocities exceeds an optimal air velocity.

3. An air pressure measuring ventilation system, comprising:

at least one duct;
at least one motorized exhaust fan;
a dust collector;
one or more workstations;
a control computer;
one or more gates; and
one or more air pressure sensors;
wherein said at least one motorized exhaust fan is configured to draw air through said at least one duct;
wherein said one or more air pressure sensors are located on a side of said at least one duct such that an air pressure is measured as said air is drawn through said at least one duct, such that one or more air pressure measurements are generated;
wherein said one or more air pressure sensors are substantially flush with an interior side of said at least one duct and do not obstruct said air as said air is drawn through said at least one duct;
wherein said ventilation system is configured to ventilate a dust that is generated at said one or more workstations;
wherein said one or more air pressure sensors do not obstruct said dust as it travels through said at least one duct from said one or more workstations to said dust collector;
wherein said one or more air pressure measurements are used to calculate a plurality of calculated air velocities;
wherein said plurality of calculated air velocities are sent to said control computer;
wherein said one or more gates are positioned along said at least one duct between said one or more workstations and said dust collector;
wherein said control computer is configured to control an opening and a closing of said one or more gates and to control a speed of said motorized exhaust fan;
wherein said control computer is configured to automatically adjust said one or more gates and adjust said speed of said motorized exhaust fan if any of said plurality of calculated air velocities are not within an optimal range; and
wherein said plurality of calculated air velocities are calibrated by taking a plurality of air velocity measurements with a removable air velocity probe placed substantially near a plurality of locations of said one or more air pressure sensors.

4. The air pressure measuring ventilation system of claim 3, wherein one of said one or more air pressure sensors are located proximate to said one or more gates, such that two hoses of said sensor are on opposite sides of said one or more gates, and such that calibration with a removable air velocity probe is unnecessary.

5. An air pressure measuring ventilation system, comprising:

at least one duct;
at least one motorized exhaust fan;
one or more air pressure sensors;
a dust collector;
one or more workstations;
a control computer; and
one or more gates;
wherein said at least one motorized exhaust fan is configured to draw air through said at least one duct;
wherein said one or more air pressure sensors are located on a side of said at least one duct such that an air pressure is measured as said air is drawn through said at least one duct, such that one or more air pressure measurements are generated;
wherein said one or more air pressure sensors are configured to be substantially flush with an interior side of said at least one duct and do not obstruct said air as said air is drawn through said at least one duct;
wherein said ventilation system is configured to ventilate a dust that is generated at said one or more workstations;
wherein said one or more air pressure sensors do not obstruct said dust as it travels along said at least one duct from said one or more workstations to said dust collector;
wherein said one or more air pressure measurements are used to calculate a plurality of calculated air velocities;
wherein said plurality of calculated air velocities are sent to said control computer;
wherein said one or more gates are positioned along said at least one duct between said one or more workstations and said dust collector;
wherein said control computer is configured to control an opening and a closing of said one or more gates and to control a speed of said motorized exhaust fan;
wherein said control computer is configured with a plurality of minimum air velocities that must be maintained;
wherein said control computer compares said plurality of calculated air velocities to a relevant minimum air velocity and determines if any of said plurality of calculated air velocities is less than said relevant minimum air velocity; and
wherein if any of said plurality of calculated air velocities is less than said relevant minimum air velocity, said control computer adjusts said one or more gates and adjusts said speed of said motorized exhaust fan such that said plurality of calculated air velocities are raised to above said relevant minimum air velocity that must be maintained.

6. The air pressure measuring ventilation system of claim 5, wherein said control computer is configured to adjust said one or more gates and adjust said speed of said motorized exhaust fan if any of said plurality of calculated air velocities are not within an optimal range.

7. The air pressure measuring ventilation system of claim 6, wherein said plurality of calculated air velocities are calibrated by taking a plurality of air velocity measurements with a removable air velocity probe placed substantially near a plurality of locations of said one or more air pressure sensors.

8. The air pressure measuring ventilation system of claim 6, wherein one of said one or more air pressure sensors are located proximate to said one or more gates, such that two hoses of said sensor are on opposite sides of said one or more gates, and such that calibration with a removable air velocity probe is unnecessary.

9. An air pressure measuring ventilation system, comprising:
- at least one duct;
- at least one motorized exhaust fan;
- one or more air pressure sensors;
- a control computer; and
- one or more gates;
- wherein said at least one motorized exhaust fan is configured to draw air through said at least one duct;
- wherein said one or more air pressure sensors are located on a side of said at least one duct such that an air pressure is measured as said air is drawn through said at least one duct, such that one or more air pressure measurements are generated;
- wherein said one or more air pressure sensors are configured to be substantially flush with an interior side of said at least one duct and do not obstruct said air as said air is drawn through said at least one duct;
- wherein said one or more gates are positioned along said at least one duct;
- wherein at least one of said one or more air pressure sensors are located substantially near said one or more gates, such that two hoses of said sensor are on opposite sides of said one or more gates, and such that calibration with a removable air velocity probe is unnecessary;
- wherein said one or more air pressure sensors are configured to measure said one or more air pressure measurements; and
- wherein said one or more air pressure measurements are used to calculate a plurality of calculated air velocities;
- wherein said plurality of calculated air velocities are sent to said control computer;
- wherein said control computer is configured with a plurality of minimum air velocities that must be maintained;
- wherein said control computer compares said plurality of calculated air velocities to a relevant minimum air velocity and determines if any of said plurality of calculated air velocities is less than said relevant minimum air velocity; and
- wherein if any of said plurality of calculated air velocities is less than said relevant minimum air velocity, said control computer adjusts said one or more gates and adjusts said speed of said motorized exhaust fan such that one or more deficient air velocities are raised to above said relevant minimum air velocities that must be maintained.

* * * * *